United States Patent
Drake et al.

(10) Patent No.: US 10,289,702 B2
(45) Date of Patent: May 14, 2019

(54) IMAGE RETRIEVAL METHOD

(71) Applicant: CANON KABUSHIKI KAISHA, Tokyo (JP)

(72) Inventors: Barry James Drake, Thornleigh (AU); Alan Valev Tonisson, Beecroft (AU); Scott Alexander Rudkin, San Francisco, CA (US)

(73) Assignee: CANON KABUSHIKI KAISHA, Tokyo (JP)

( * ) Notice: Subject to any disclaimer, the term of this patent is extended or adjusted under 35 U.S.C. 154(b) by 864 days.

(21) Appl. No.: 14/348,338

(22) PCT Filed: Sep. 25, 2012

(86) PCT No.: PCT/AU2012/001154
§ 371 (c)(1),
(2) Date: Mar. 28, 2014

(87) PCT Pub. No.: WO2013/044295
PCT Pub. Date: Apr. 4, 2013

(65) Prior Publication Data
US 2014/0236963 A1  Aug. 21, 2014

(30) Foreign Application Priority Data
Sep. 30, 2011 (AU) .................................. 2011226985

(51) Int. Cl.
*G06F 17/30* (2006.01)
*G06T 7/12* (2017.01)
(Continued)

(52) U.S. Cl.
CPC .... *G06F 17/30271* (2013.01); *G06F 17/3033* (2013.01); *G06F 17/30247* (2013.01);
(Continued)

(58) Field of Classification Search
CPC ......... G06F 17/30247; G06F 17/30271; G06F 17/3033
(Continued)

(56) References Cited

U.S. PATENT DOCUMENTS 6,122,628 A * 9/2000 Castelli ............ G06F 17/30333
7,257,533 B2 * 8/2007 Charlesworth ... G06F 17/30038
704/249
(Continued)

FOREIGN PATENT DOCUMENTS

WO  2009-133856 A1  11/2009

OTHER PUBLICATIONS

Panigrahy, R. Entropy based nearest neighbor search in high dimensions. In Proceedings of the Seventeenth Annual ACM-SIAM Symposium on Discrete Algorithms, Proceedings from SODA06, Miami, Florida, USA, 2006; ACM: 2006; p. 1195.
(Continued)

*Primary Examiner* — Monica M Pyo
(74) *Attorney, Agent, or Firm* — Canon U.S.A., Inc. IP Division

(57) ABSTRACT

A system and method for linking a hash code to a portion of an image. A plurality of lattice points is selected in a multidimensional lattice to form a smallest enclosing region about a feature vector representing the portion of the image and a lattice point is determined from the selected plurality of lattice points according to a distribution criteria. The determined lattice point is common to the smallest enclosing region and a region of the lattice adjacent to the smallest enclosing region located within a query radius distance of the feature vector. When the feature vector is located within the query radius of a query vector the feature vector is considered a match. The method assigns the feature vector to the determined lattice point and stores a link between a hash code associated with the determined lattice point and the portion of the image.

14 Claims, 15 Drawing Sheets

(51) Int. Cl.
*G06T 7/149* (2017.01)
*G06K 9/62* (2006.01)
*H04N 19/60* (2014.01)

(52) U.S. Cl.
CPC ............. *G06T 7/12* (2017.01); *G06T 7/149* (2017.01); *G06K 9/6261* (2013.01); *H04N 19/60* (2014.11)

(58) Field of Classification Search
USPC .......................................... 382/173; 707/747
See application file for complete search history.

(56) References Cited

U.S. PATENT DOCUMENTS

| | | | |
|---|---|---|---|
| 2007/0217676 | A1 | 9/2007 | Grauman et al. |
| 2009/0019149 | A1 | 1/2009 | Cohen et al. |
| 2010/0244666 | A1* | 9/2010 | Tanaka ............... H01L 51/5212 313/504 |
| 2013/0279806 | A1* | 10/2013 | Tonisson ............ G06T 7/2033 382/173 |

OTHER PUBLICATIONS

Lv, Q.; Josephson, W.; Wang, Z.; Charikar, M.; Li, K.; A Time-Space Efficient Locality Sensitive Hashing Method for Similarity Search in High Dimensions Princeton University: Princeton, Jun. 2006.

Andrew Adams, Jongmin Baek, Abe Davis. Fast High-Dimensional Filtering Using the Permutohedral Lattice. In Eurographics Digital Library: Computer Graphics Forum vol. 29—Issue 2 (EG 2010 Proceedings), Proceedings from Eurographics, Norrköping, Sweden, 2010; European Association for Computer Graphics: WWW, 2010.

Yossi Azar; Andrei Z. Broder; Anna R. Karlin; Eli Upfal. Balanced Allocations. SIAM Journal on Computing Sep. 1999, 29, pp. 180-200.

Kise, K., Noguchi, K., Iwamura, M. Simple representation and approximate search of feature vectors for large-scale object recognition. In Proceedings British Machine Vision Conference 2007, Proceedings from British Machine Vision Conference, 2007; Citeseer: 2007; p. 182-191.

\* cited by examiner

IMAGE RETRIEVAL METHOD

This application claims the benefit of priority from Australia Patent Application No. 2011226985 filed on Sep. 30, 2011, which is herein incorporated by reference by its entirety.

TECHNICAL FIELD

The present disclosure relates to high-dimensional similarity searching and, in particular, to the field of content-based image searching.

BACKGROUND

Many approaches have been proposed to address the problem of content-based image searching, particularly when a database of images is large, and when a query image is a distorted version of the requested database image.

Many of the proposed approaches use feature vectors. A feature vector is an array of numbers that represents a portion of an image. When a new feature vector is received, it is often useful to be able to retrieve similar feature vectors from the database. The similar feature vectors will represent similar images to the image associated with the received feature vector.

When the database is small and the similarity function is fast to compute, then an exhaustive search method can be used. An exhaustive search computes the similarity between a query vector associated with a query image and each record in the database. Such an exhaustive search is too slow for many applications, particularly once the size of the database becomes large. One of the problems with content-based image searching is how to quickly find in the database those feature vectors that match a feature vector of a query image. While many approaches have been proposed, each of the proposed approaches suffers from limitations or inaccuracies.

Hash-based strategies provide approaches that are closest to being both fast and accurate. Hash-based approaches involve computing a hash code for each vector in a database, and using the hash code to associate records with entries in a hash table. At query time, a hash code is computed for a query vector and the hash code is used to quickly find matching records in the hash table. For this strategy to be effective, the hash function should be 'locality sensitive', which means the function returns the same hash code for vectors that are close to each other. A locality sensitive hash function partitions a feature space into regions, where each region is associated with a particular hash code.

One problem that exists with the hash-based approaches is that for any hash function there will always be two vectors that are close but return different hash codes. This will occur when the two vectors are located either side of a partition boundary and leads to the problem of false-negative matches. False-negative matches occur when the method fails to find similar vectors because the respective hash codes of the similar vectors are different.

One known approach to this problem is Locality-sensitive hashing (LSH), which uses multiple hash functions with randomly chosen parameters for each of the hash functions. Each feature vector in the database is hashed using all of the hash functions and is recorded in a corresponding hash table. Given a query vector, all the hash functions are used to access the stored records. As each hash function is different, the probability of a false-negative match decreases with an increase in the number of hash functions used. However, an increase in the number of hash functions also increases the amount of memory required for hash storage and the time taken for searching the hash table. Varying the number of hash functions allows for a trade-off between memory, speed, and accuracy to be selected, but LSH requires many hash functions to achieve high accuracy when used with high-dimensional feature vectors. An extension to LSH selects the hash functions to balance the number of allocations to each hash code allows further trade-off between accuracy and speed. The balance is achieved by selecting hash functions for each dimension of the hash code to balance allocations of records and is achieved by selecting the hash functions to jointly optimise the preservation of similarity, and entropy of the hash function. A disadvantage of the LSH extension is that the hash functions are selected during a training phase and will balance record allocations according to the distribution of training data. The effectiveness of the balancing will be decreased by any variation in the distribution of further data compared to the training data. This memory requirement has limited the usefulness of LSH when applied to large databases of high-dimensional vectors.

Another approach is Point Perturbation, which uses a single hash function with the problem of false-negative matches being dealt with in the search step. When given a query vector, the hash table is accessed to get a first list of candidate records. A number of probes are generated by applying a small random perturbation to the original query point. Each probe is used to access the hash table and the retrieved records are added to the list of candidate records. The process of generating additional probes from the original query point is repeated several times. The probability of a false-negative match decreases with an increase in the number of probes used, so varying the number of probes manages a trade-off between speed and accuracy, while having a lower memory requirement than using LSH. The disadvantage of Point Perturbation is the number of probes required for a query vector. Point Perturbation becomes slower as the dimensionality of the vectors increases since, for a single query vector, more probes are required to achieve high accuracy.

Another hashing approach is Hash Perturbation. Hash Perturbation is similar to Point Perturbation, in that hash perturbation performs multiple probes per query, but avoids the problem of needing to randomly perturb the query point. Instead, this method directly perturbs the hash code of the original query point. This is made possible because the hash function produces hash codes that are composed of many small hash codes, where each of the smaller hash codes is a function of exactly one coordinate of the feature vector. An early implementation of this approach is Grid Files. The Grid Files method forms a grid over the space of possible vectors by quantizing each dimension, and associates each grid cell with the records whose vectors fall within the cell. Given a query point, the method determines the grid cells that are within a query radius of the query point. The method then checks the records associated with the accessed grid cells for matching points. Unfortunately, this method is slow for high dimensional spaces. The reason is that when given an n-dimensional space, the number of accessed grid cells for one query is of the order $2^n$. As each dimension is independently hashed, a hash code is associated with a rectangular region in the space, and a query covers a rectangular region that is composed of the union of the hash cells. In the extreme, each dimension is hashed to a single bit. In that case, the hash code for a vector is the concatenation of the bits from each coordinate. Thus an n-dimensional vector leads to an n-bit hash code. Additional query hash codes are generated by flipping one or more bits in the first hash code.

One problem with Hash Perturbation is that each dimension is independently hashed. The hash function partitions the space into rectangular regions. If a query point is near the corner of a region, then $2^n$ probes are needed to avoid false-negatives. For high dimensional vectors (large n), the number of required probes can significantly limit the speedup provided by hashing. This can be ameliorated by reducing the number of probes per query, but this also reduces accuracy.

Lattice theory has been applied to Point Perturbation and Hash Perturbation, using lattices known as A* and D*. This has led to methods that determine probes for a query which are based on the location of a query point within a Voronoi region. When a record with an associated vector is added to the database, the method determines in which Voronoi region the vector is located, and associates the record with the corresponding lattice point. For example, one method uses a hash code associated with the lattice point. When a query vector is received, the lattice point nearest to the query vector is used to access records associated with the lattice point. Additional probes for the query are determined by calculating the distance from the query point to a wall of the Voronoi region. If the distance is sufficiently small, then the lattice point on the other side of the wall is used as a probe. Unfortunately, when the vectors have a large number of dimensions, the number of walls of a Voronoi region is extremely large and calculating the distance from the query point to a wall is slow. Therefore, this method is inappropriate for systems with high-dimensional vectors and that need accurate and fast queries.

For a random hash function, 2-way chaining can be applied to achieve balanced allocations. The method uses a pair of hash functions, thus providing two hash codes for each object. At insertion time, a greedy algorithm selects the hash code with the lowest number of existing registrations. At retrieval time, both query hash codes are used to retrieve objects. Compared to unbalanced hash allocation with a random hash function, the expected maximum registration to any hash code is reduced exponentially by using the 2-way chaining algorithm.

Thus, a need exists to provide an improved method and system for content-based image searching.

SUMMARY

It is an object of the present invention to overcome substantially, or at least ameliorate, one or more disadvantages of existing arrangements.

According to a first aspect of the present disclosure, there is provided a method for linking a hash code to a portion of an image. The method includes the steps of: selecting a plurality of lattice points in a multidimensional lattice to form a smallest enclosing region about a feature vector representing the portion of the image; determining a lattice point from the selected plurality of lattice points according to a distribution criteria, the determined lattice point being common to the smallest enclosing region and a region of the lattice adjacent to the smallest enclosing region located within a query radius distance of the feature vector, wherein when the feature vector is located within the query radius of a query vector the feature vector is considered a match; assigning the feature vector to the determined lattice point; and storing a link between a hash code associated with the determined lattice point and the portion of the image.

According to a second aspect of the present disclosure, there is provided a system for linking a hash code to a portion of an image. The system includes: a storage device for storing a computer program; and a processor for executing the program. The program comprises code for performing the method steps of: selecting a plurality of lattice points in a multidimensional lattice to form a smallest enclosing region about a feature vector representing the portion of the image; determining a lattice point from the selected plurality of lattice points according to a distribution criteria, the determined lattice point being common to the smallest enclosing region and a region of the lattice adjacent to the smallest enclosing region located within a query radius distance of the feature vector, wherein when the feature vector is located within the query radius of a query vector the feature vector is considered a match; assigning the feature vector to the determined lattice point; and storing a link between a hash code associated with the determined lattice point and the portion of the image.

According to a third aspect of the present disclosure, there is provided a computer readable storage medium having recorded thereon a computer program for directing a processor to execute a method of linking a hash code to a portion of an image. The computer program comprises code for performing the steps of: selecting a plurality of lattice points in a multidimensional lattice to form a smallest enclosing region about a feature vector representing the portion of the image; determining a lattice point from the selected plurality of lattice points according to a distribution criteria, the determined lattice point being common to the smallest enclosing region and a region of the lattice adjacent to the smallest enclosing region located within a query radius distance of the feature vector, wherein when the feature vector is located within the query radius of a query vector the feature vector is considered a match; assigning the feature vector to the determined lattice point; and storing a link between a hash code associated with the determined lattice point and the portion of the image.

According to a fourth aspect of the present disclosure, there is provided a hash table storage and retrieval method, comprising the steps of: performing a registration phase to store at least one record, wherein for each of said stored records said registration phase includes the steps of: generating a hash code for a feature vector associated with the record, based on the feature vector and a present state of a hash table; and associating the record with the generated hash code in the hash table; and performing a query phase to retrieve at least one of said stored records from said hash table, said query phase including the steps of: identifying hash codes in said hash table that are associated with feature vectors that satisfy a search criteria; and retrieving at least one record assigned to at least one of said identified hash codes.

According to a fifth aspect of the present disclosure, there is provided a hash table storage and retrieval system comprising: a storage device for storing a computer program; and a processor for executing the program. The program comprises code for performing the method steps of: performing a registration phase to store at least one record, wherein for each of said stored records said registration phase includes the steps of: generating a hash code for a feature vector associated with the record, based on the feature vector and a present state of a hash table; and associating the record with the generated hash code in the hash table; and performing a query phase to retrieve at least one of said stored records from said hash table, said query phase including the steps of: identifying hash codes in said hash table that are associated with feature vectors that satisfy a search criteria; and retrieving at least one record assigned to at least one of said identified hash codes.

According to a sixth aspect of the present disclosure, there is provided a computer readable storage medium having recorded thereon a computer program for directing a processor to execute a method of hash table storage and retrieval, said computer program comprising code for performing the steps of: performing a registration phase to store at least one record, wherein for each of said stored records said registration phase includes the steps of: generating a hash code for a feature vector associated with the record, based on the feature vector and a present state of a hash table; and associating the record with the generated hash code in the hash table; and performing a query phase to retrieve at least one of said stored records from said hash table, said query phase including the steps of: identifying hash codes in said hash table that are associated with feature vectors that satisfy a search criteria; and retrieving at least one record assigned to at least one of said identified hash codes.

According to another aspect of the present disclosure, there is provided an apparatus for implementing any one of the aforementioned methods.

According to another aspect of the present disclosure, there is provided a computer program product including a computer readable medium having recorded thereon a computer program for implementing any one of the aforementioned methods.

Other aspects of the invention are also disclosed.

BRIEF DESCRIPTION OF THE DRAWINGS

At least one embodiment of the invention will now be described with reference to the following drawings, in which.

DETAILED DESCRIPTION INCLUDING BEST MODE

Figure 1:
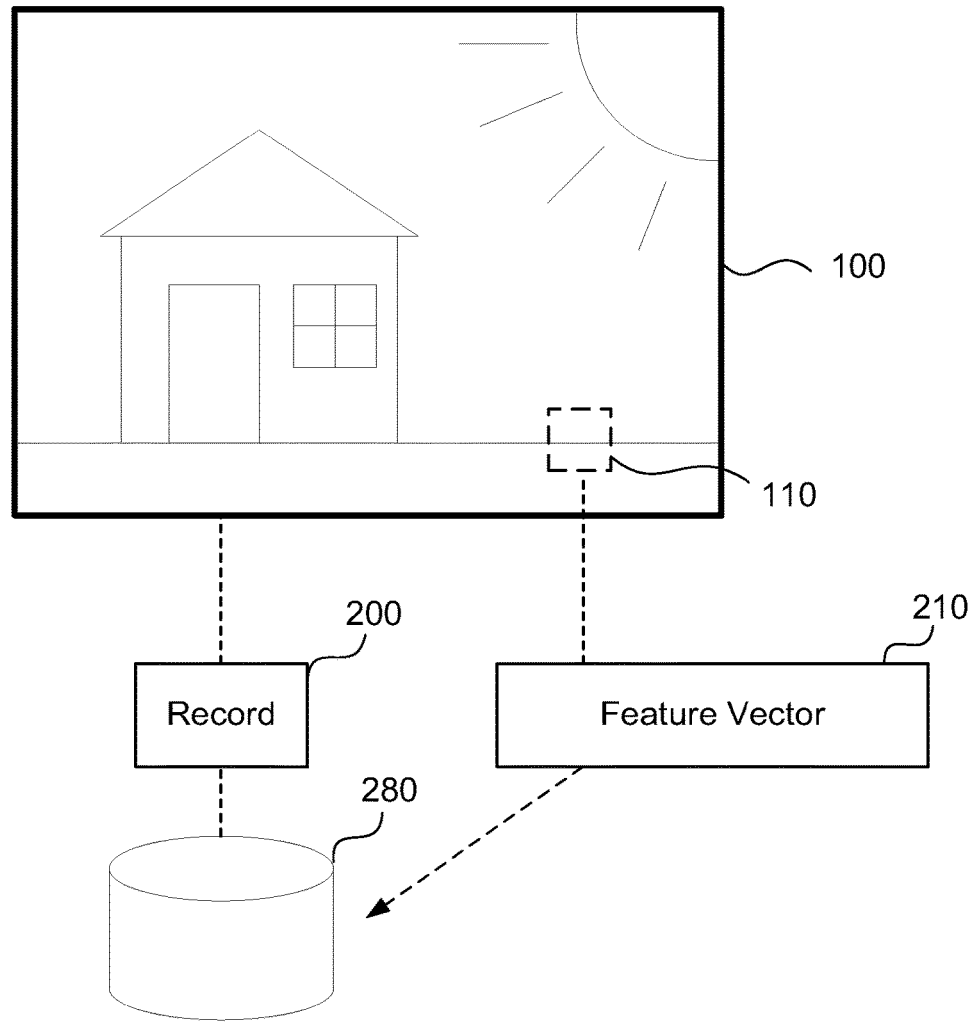
FIG. 1 is a representation of an image, image portion, and feature vector associated with an image portion.

Where reference is made in any one or more of the accompanying drawings to steps and/or features that have the same reference numerals, those steps and/or features have for the purposes of this description the same function(s) or operation(s), unless the contrary intention appears.

The present disclosure relates to the storage and retrieval of records. The described arrangements may be used in a retrieval system to create and access a hash table for efficiently retrieving records associated with n-dimensional feature vectors, where the vectors of the retrieved records are located within a specified query radius of a given query vector. This is particularly useful when false-negatives are costly, as the system can be used to minimise false-negatives when the query radius is known at the time that the system is configured.

A first, registration phase relates to the storage of one or more records. A second, query phase relates to retrieval of one or more of the stored records, in accordance with a search criteria. The registration phase generates a hash code for a feature vector based on the feature vector and a present state of the hash table. The registration phase then associates a record associated with the feature vector with the generated hash code in the hash table. A second, query phase identifies those hash codes that are used by vectors that satisfy a search criteria.

A retrieval system in accordance with the present disclosure may be implemented to store and retrieve records associated with images, wherein each image is associated with a feature vector and a record. The feature vector is used as a key for storing the corresponding record. The record contains information relating to the image. The information may include, for example, but is not limited to, the corresponding feature vector, the image, a portion of the image, a subsampled version of the image, owner information, access information, printing information, or any combination thereof.

A retrieval system in accordance with the present disclosure may also be implemented for non-imaging applications, such as the retrieval of text, a portion of text, or a paper-fingerprint.

One aspect of the present disclosure provides a method, system, and computer program product for linking a hash code to a portion of an image. The method selects a plurality of lattice points in a multidimensional lattice to form a smallest enclosing region about a feature vector representing the portion of the image. The method determines a lattice point from the selected plurality of lattice points according to a distribution criteria, wherein the determined lattice point is common to the smallest enclosing region and a region of the lattice adjacent to the smallest enclosing region located within a query radius distance of the feature vector. When the feature vector is located within the query radius of a query vector the feature vector is considered a match. The method assigns the feature vector to the determined lattice point and stores a link between a hash code associated with the determined lattice point and the portion of the image.

Another aspect of the present disclosure provides a hash table storage and retrieval method, system, and computer program product. The method performs a registration phase to store at least one record in a hash table and a query phase to retrieve at least one of the stored records from the hash table. For each of the stored records, the registration phase generates a hash code for a feature vector associated with the record, based on the feature vector and a present state of a hash table, and associates the record with the generated hash code in the hash table. The query phase identifies hash codes for the hash table that are associated with feature vectors that satisfy a search criteria and retrieves at least one record assigned to at least one of the identified hash codes.

Figure 14A:
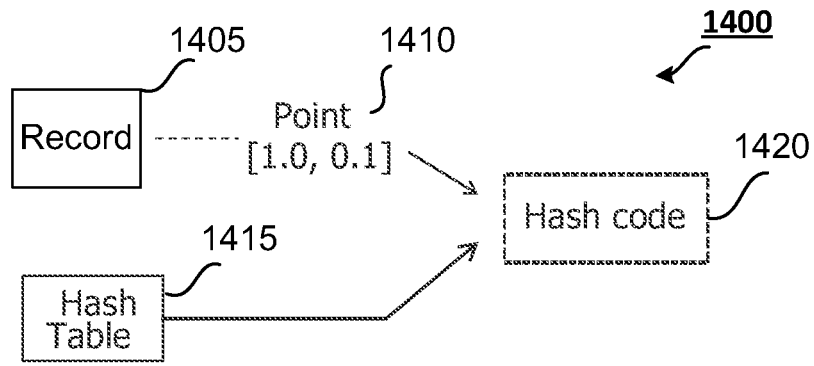
FIGS. 14A, 14B, and 14C illustrate registration and query phases of a retrieval system.
Figure 14B:
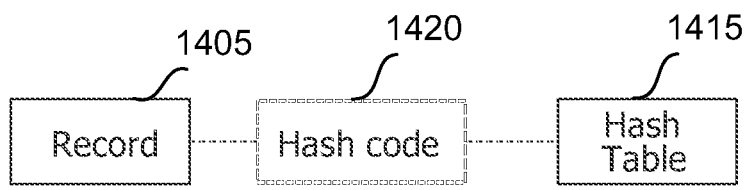
Figure 14C:
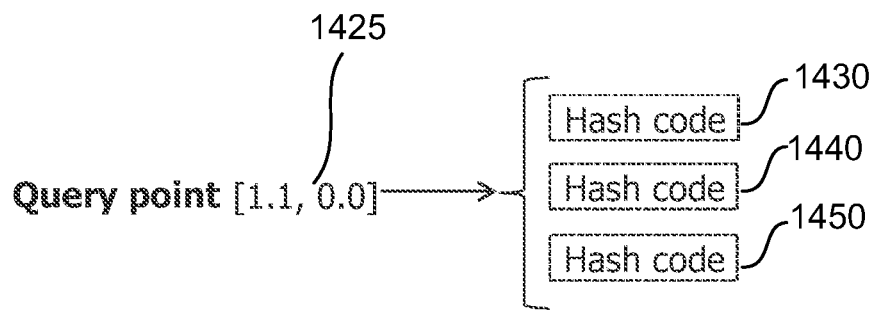

FIG. 14A shows a record 1405 and an associated feature vector 1410 in the form of a point [1.0, 0.1]. The registration phase generates a hash code 1420 for the feature vector 1410 based on the co-ordinates of the point and the present state of a hash table 1415. FIG. 14B shows the record 1405 being associated with the generated hash code 1420 in the hash table 1415. FIG. 14C shows the query phase in which a query vector 1425 in the form of a point [1.1, 0.0] is used to identify those hash codes 1430, 1440, 1450 in the hash table 1415 that are used by points that match the query vector 1425.

At least one embodiment of the present disclosure will be described in which a hash function is defined using an A* lattice. The A* family can be defined in terms of the A lattice family. The lattice $A_n$ is defined as:

$$A_n = \{p \in Z^{(n+1)} | \Sigma_i p_i = 0\}.$$

$A_n$ is an n-dimensional lattice, that is embedded in $R^{(n+1)}$ to make the coordinates integers. The dual of $A_n$ is $A_n^*$, similarly embedded inside the same n-dimensional subspace. $A_n^*$ is defined by:

$$A_n^* = \{p \in R^{(n+1)} | \Sigma_i p_i = 0, \forall q \in A_n, p \cdot q \in Z\}.$$

When a record with an associated feature vector is received, a nearby lattice point is chosen and used to determine a hash code for the vector. A nearby lattice point is a point in the lattice that corresponds to a corner of the Delaunay region containing the vector. Given an arbitrary but particular lattice, each Delaunay region of the lattice will have corners that are within some predetermined range of each other. Therefore, a nearby lattice point is a point in the lattice that is within some predetermined range of the vector. However, it is not true that every lattice point within some predetermined range of the vector is a "nearby lattice point". The hash code is linked to the lattice point and it may be possible to use the hash code to determine the lattice point and to determine the hash code from the lattice point. The result is that the hash code and the lattice point represent the same information and may be used interchangeably. In one embodiment, the lattice point is the hash code. Another embodiment applies a function to the lattice point to determine the hash code. The record is associated with the hash code using a hash table. When a query vector is received, the lattice points at the corners of the enclosing Delaunay region are located, and a query hash code is determined corresponding to each of the located lattice points. The hash table is used to retrieve the records associated with each query hash code.

It will be appreciated by a person skilled in the relevant art that embodiments of the present disclosure may be practised by applying multidimensional lattices other than the A* lattice without departing from the spirit and scope of the present disclosure. For example, the A lattice, D lattice, D* lattice, Z lattice, and Leech lattice may also be used.

Figure 13A:
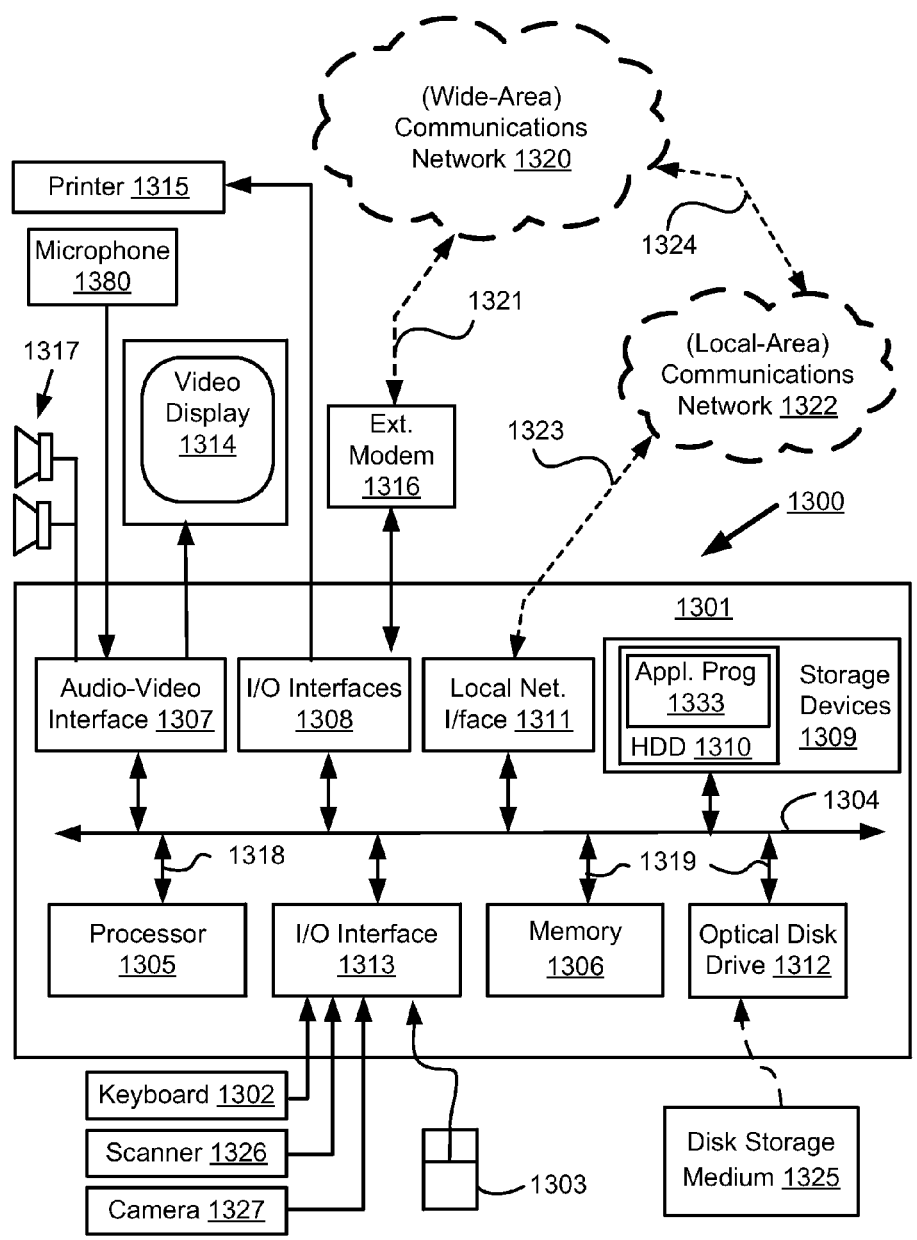
FIGS. 13A and 13B form a schematic block diagram of a general purpose computer system upon which arrangements described can be practised.
Figure 13B:
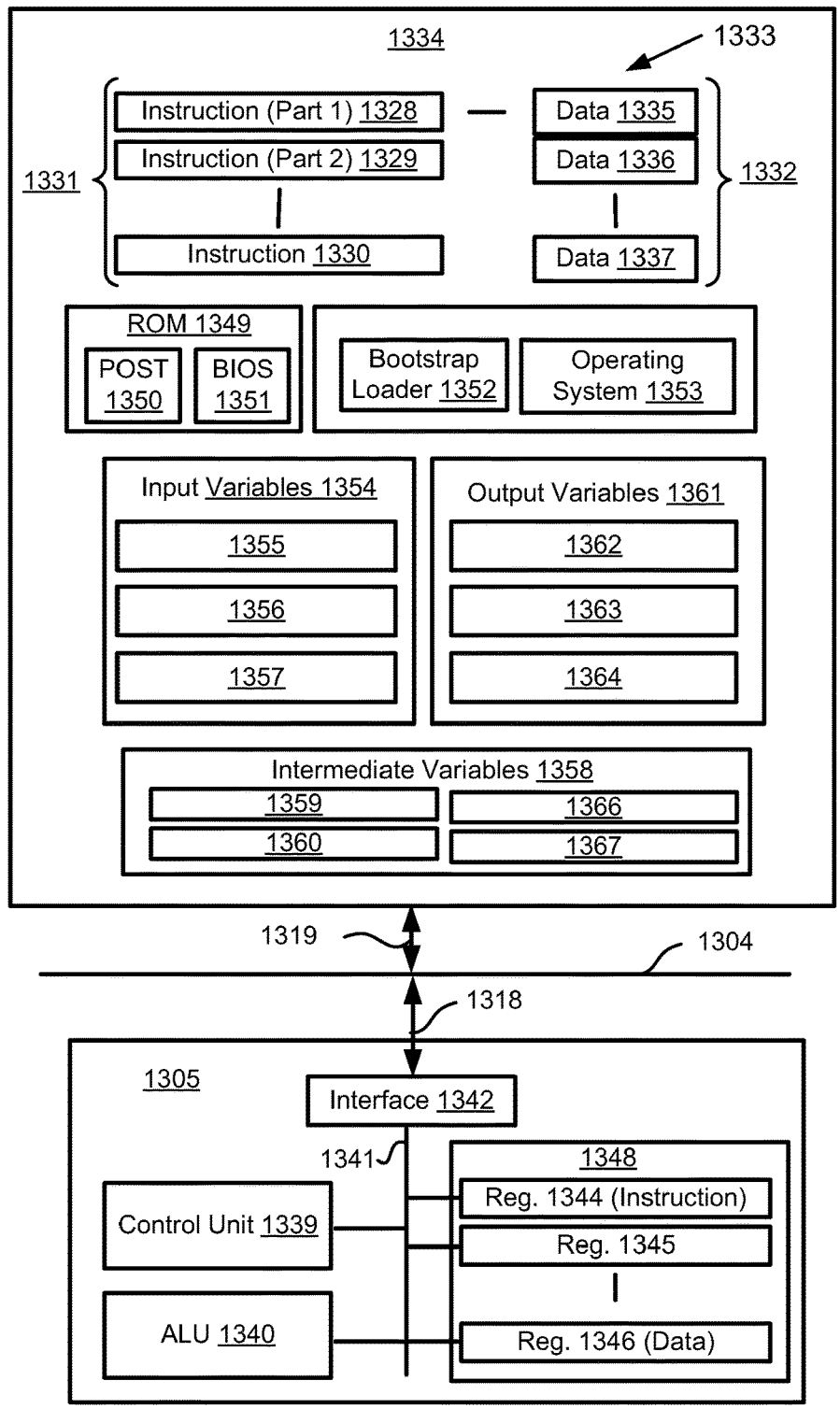

FIGS. 13A and 13B depict a general-purpose computer system 1300, upon which the various arrangements described can be practised.

As seen in FIG. 13A, the computer system 1300 includes: a computer module 1301; input devices such as a keyboard 1302, a mouse pointer device 1303, a scanner 1326, a camera 1327, and a microphone 1380; and output devices including a printer 1315, a display device 1314 and loudspeakers 1317. An external Modulator-Demodulator (Modem) transceiver device 1316 may be used by the computer module 1301 for communicating to and from a communications network 1320 via a connection 1321. The communications network 1320 may be a wide-area network (WAN), such as the Internet, a cellular telecommunications network, or a private WAN. Where the connection 1321 is a telephone line, the modem 1316 may be a traditional "dial-up" modem. Alternatively, where the connection 1321 is a high capacity (e.g., cable) connection, the modem 1316 may be a broadband modem. A wireless modem may also be used for wireless connection to the communications network 1320.

The computer module 1301 typically includes at least one processor unit 1305, and a memory unit 1306. For example, the memory unit 1306 may have semiconductor random access memory (RAM) and semiconductor read only memory (ROM). The computer module 1301 also includes an number of input/output (I/O) interfaces including: an audio-video interface 1307 that couples to the video display 1314, loudspeakers 1317 and microphone 1380; an I/O interface 1313 that couples to the keyboard 1302, mouse 1303, scanner 1326, camera 1327 and optionally a joystick or other human interface device (not illustrated); and an interface 1308 for the external modem 1316 and printer 1315. In some implementations, the modem 1316 may be incorporated within the computer module 1301, for example within the interface 1308. The computer module 1301 also has a local network interface 1311, which permits coupling of the computer system 1300 via a connection 1323 to a local-area communications network 1322, known as a Local Area Network (LAN). As illustrated in FIG. 13A, the local communications network 1322 may also couple to the wide network 1320 via a connection 1324, which would typically include a so-called "firewall" device or device of similar functionality. The local network interface 1311 may comprise an Ethernet™ circuit card, a Bluetooth™ wireless arrangement, or an IEEE 802.11 wireless arrangement; however, numerous other types of interfaces may be practised for the interface 1311.

The I/O interfaces 1308 and 1313 may afford either or both of serial and parallel connectivity, the former typically being implemented according to the Universal Serial Bus (USB) standards and having corresponding USB connectors (not illustrated). Storage devices 1309 are provided and typically include a hard disk drive (HDD) 1310. Other storage devices such as a floppy disk drive and a magnetic tape drive (not illustrated) may also be used. An optical disk drive 1312 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1300.

The components 1305 to 1313 of the computer module 1301 typically communicate via an interconnected bus 1304 and in a manner that results in a conventional mode of operation of the computer system 1300 known to those in the relevant art. For example, the processor 1305 is coupled to the system bus 1304 using a connection 1318. Likewise, the memory 1306 and optical disk drive 1312 are coupled to the system bus 1304 by connections 1319. Examples of computers on which the described arrangements can be practised include IBM-PCs and compatibles, Sun Sparcstations, Apple Mac™, or alike computer systems.

The methods of linking a hash code to a portion of an image and hash code storage and retrieval may be implemented using the computer system 1300 wherein the processes of FIGS. 1 to 12 and 14A to 14C, described herein, may be implemented as one or more software application programs 1333 executable within the computer system 1300. In particular, the steps of the methods of linking a hash code to a portion of an image and hash code storage and retrieval are effected by instructions 1331 (see FIG. 13B) in the software 1333 that are carried out within the computer system 1300. The software instructions 1331 may be formed as one or more code modules, each for performing one or more particular tasks. The software may also be divided into two separate parts, in which a first part and the corresponding code modules performs the linking, storing, and retrieving methods and a second part and the corresponding code modules manage a user interface between the first part and the user.

The software may be stored in a computer readable medium, including the storage devices described below, for example. The software is loaded into the computer system 1300 from the computer readable medium, and then executed by the computer system 1300. A computer readable medium having such software or computer program recorded on the computer readable medium is a computer program product. The use of the computer program product in the computer system 1300 preferably effects one or more advantageous apparatus for linking a hash code to a portion of an image and hash code storage and retrieval.

The software 1333 is typically stored or recorded in the HDD 1310 or the memory 1306. The software is loaded into the computer system 1300 from a computer readable medium, and executed by the computer system 1300. Thus, for example, the software 1333 may be stored on an optically readable disk storage medium (e.g., CD-ROM) 1325 that is read by the optical disk drive 1312. A computer readable medium having such software or computer program recorded thereon is a computer program product. The use of the computer program product in the computer system 1300 preferably effects one or more advantageous apparatus for linking a hash code to a portion of an image and hash code storage and retrieval.

In some instances, the application programs 1333 may be supplied to the user encoded on one or more CD-ROMs 1325 and read via the corresponding drive 1312, or alternatively may be read by the user from the networks 1320 or 1322. Still further, the software can also be loaded into the computer system 1300 from other computer readable media. Computer readable storage media refers to any non-transitory tangible storage medium that provides recorded instructions and/or data to the computer system 1300 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 1301. Examples of transitory or non-tangible computer readable transmission media that may also participate in the provision of software, application programs, instructions and/or data to the computer module 1301 include radio or infra-red transmission channels as well as a network connection to another computer or networked device, and the Internet or Intranets including e-mail transmissions and information recorded on Websites and the like.

The second part of the application programs 1333 and the corresponding code modules mentioned above may be executed to implement one or more graphical user interfaces (GUIs) to be rendered or otherwise represented upon the display 1314. Through manipulation of typically the keyboard 1302 and the mouse 1303, a user of the computer system 1300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1317 and user voice commands input via the microphone 1380.

FIG. 13B is a detailed schematic block diagram of the processor 1305 and a "memory" 1334. The memory 1334 represents a logical aggregation of all the memory modules (including the HDD 1309 and semiconductor memory 1306) that can be accessed by the computer module 1301 in FIG. 13A.

When the computer module 1301 is initially powered up, a power-on self-test (POST) program 1350 executes. The POST program 1350 is typically stored in a ROM 1349 of the semiconductor memory 1306 of FIG. 13A. A hardware device such as the ROM 1349 storing software is sometimes referred to as firmware. The POST program 1350 examines hardware within the computer module 1301 to ensure proper functioning and typically checks the processor 1305, the memory 1334 (1309, 1306), and a basic input-output systems software (BIOS) module 1351, also typically stored in the ROM 1349, for correct operation. Once the POST program 1350 has run successfully, the BIOS 1351 activates the hard disk drive 1310 of FIG. 13A. Activation of the hard disk drive 1310 causes a bootstrap loader program 1352 that is resident on the hard disk drive 1310 to execute via the processor 1305. This loads an operating system 1353 into the RAM memory 1306, upon which the operating system 1353 commences operation. The operating system 1353 is a system level application, executable by the processor 1305, to fulfil various high level functions, including processor management, memory management, device management, storage management, software application interface, and generic user interface.

The operating system 1353 manages the memory 1334 (1309, 1306) to ensure that each process or application running on the computer module 1301 has sufficient memory in which to execute without colliding with memory allocated to another process. Furthermore, the different types of memory available in the system 1300 of FIG. 13A must be used properly so that each process can run effectively. Accordingly, the aggregated memory 1334 is not intended to illustrate how particular segments of memory are allocated (unless otherwise stated), but rather to provide a general view of the memory accessible by the computer system 1300 and how such is used.

As shown in FIG. 13B, the processor 1305 includes a number of functional modules including a control unit 1339, an arithmetic logic unit (ALU) 1340, and a local or internal memory 1348, sometimes called a cache memory. The cache memory 1348 typically include a number of storage registers 1344-1346 in a register section. One or more internal busses 1341 functionally interconnect these functional modules. The processor 1305 typically also has one or more interfaces 1342 for communicating with external devices via the system bus 1304, using a connection 1318. The memory 1334 is coupled to the bus 1304 using a connection 1319.

The application program 1333 includes a sequence of instructions 1331 that may include conditional branch and loop instructions. The program 1333 may also include data 1332 which is used in execution of the program 1333. The instructions 1331 and the data 1332 are stored in memory locations 1328, 1329, 1330 and 1335, 1336, 1337, respectively. Depending upon the relative size of the instructions 1331 and the memory locations 1328-1330, a particular instruction may be stored in a single memory location as depicted by the instruction shown in the memory location 1330. Alternatively, an instruction may be segmented into a number of parts, each of which is stored in a separate memory location, as depicted by the instruction segments shown in the memory locations 1328 and 1329.

In general, the processor 1305 is given a set of instructions which are executed therein. The processor 1105 waits for a subsequent input, to which the processor 1305 reacts to by executing another set of instructions. Each input may be provided from one or more of a number of sources, including data generated by one or more of the input devices 1302, 1303, data received from an external source across one of the networks 1320, 1302, data retrieved from one of the storage devices 1306, 1309 or data retrieved from a storage medium 1325 inserted into the corresponding reader 1312, all depicted in FIG. 13A. The execution of a set of the instructions may in some cases result in output of data. Execution may also involve storing data or variables to the memory 1334.

The disclosed hash code linking, storing, and retrieving arrangements use input variables 1354, which are stored in the memory 1334 in corresponding memory locations 1355, 1356, 1357. The hash code linking, storing, and retrieving arrangements produce output variables 1361, which are stored in the memory 1334 in corresponding memory locations 1362, 1363, 1364. Intermediate variables 1358 may be stored in memory locations 1359, 1360, 1366 and 1367.

Referring to the processor 1305 of FIG. 13B, the registers 1344, 1345, 1346, the arithmetic logic unit (ALU) 1340, and the control unit 1339 work together to perform sequences of micro-operations needed to perform "fetch, decode, and execute" cycles for every instruction in the instruction set making up the program 1333. Each fetch, decode, and execute cycle comprises:

(a) a fetch operation, which fetches or reads an instruction 1331 from a memory location 1328, 1329, 1330;

(b) a decode operation in which the control unit 1339 determines which instruction has been fetched; and (c) an execute operation in which the control unit 1339 and/or the ALU 1340 execute the instruction.

Thereafter, a further fetch, decode, and execute cycle for the next instruction may be executed. Similarly, a store cycle may be performed by which the control unit 1339 stores or writes a value to a memory location 1332.

Each step or sub-process in the processes of FIGS. 1 to 12 and 14A to 14C is associated with one or more segments of the program 1333 and is performed by the register section 1344, 1345, 1347, the ALU 1340, and the control unit 1339 in the processor 1305 working together to perform the fetch, decode, and execute cycles for every instruction in the instruction set for the noted segments of the program 1333.

The methods of linking a hash code to a portion of an image and hash code storage and retrieval may alternatively be implemented in dedicated hardware such as one or more integrated circuits performing the functions or sub functions of selecting lattice points, determining a lattice point according to a distribution criteria, assigning a feature vector to the determined lattice point, storing a link between a hash code associated with the determined lattice point and the portion of the image, performing a registration phase, and performing a query phase. Such dedicated hardware may include graphic processors, digital signal processors, or one or more microprocessors and associated memories.

An embodiment of the retrieval system involving image retrieval will be explained with reference to FIG. 1 and FIG. 6. FIG. 1 shows an image 100 that is associated with a record 200, where the record 200 may be stored in a hash table in a database 280. The record 200 contains information relating to the image. The image 100 is processed by an image feature extractor, such as 'Scale Invariant Feature Transform' (SIFT), to identify a region 110 of the image 100 from which to determine a feature vector 210 associated with the image 100. The feature vector 210 may then be stored in the database 280 and associated with the image record 200.

An image record may contain information about an image. For example, the image record may record pixel values of the image in some format, such as jpeg, or a file name or resource locator for accessing the image. The image record may contain ownership details or information about processes involving the image. For example, the image record may contain information relating to who printed the image, or where and when the image was printed. The image record may record a feature vector, or some compressed version of the feature vector, or some identifier indicating the feature vector. Feature vectors produced from an image, such as the feature vector 210 of FIG. 1, are shown in a feature space representation in FIG. 2. It should be noted that feature vectors may be treated as points in a space such as feature space 260 of FIG. 2. For this reason, the terms 'vector', 'feature vector', and 'point' may be used interchangeably to refer to an array of numbers that, in the present embodiment, represent a portion of an image. As a vector may be treated as a point, then a measure of dissimilarity between two vectors may be treated as a distance between the two corresponding points so that a distance is possible between two vectors.

Figure 2:
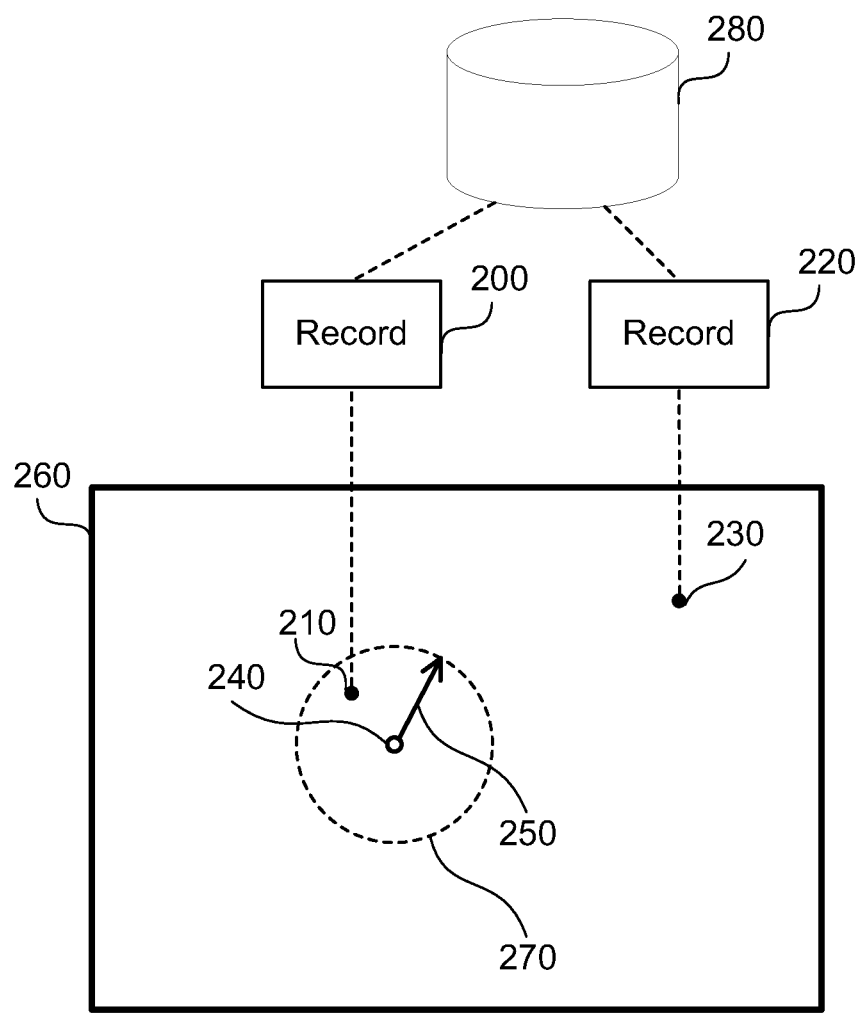
FIG. 2 is a diagram illustrating a spatial interpretation of a vector, query point, and query radius.

FIG. 2 shows the database 280, in which are stored two records, 200 and 220. The two records 200 and 220 are associated with first and second images, which are not shown. The records 200 and 220 may store the same type of information about the respective first and second images. In one example, record 200 stores a last print date for the first image and record 220 stores a last print date for the second image. Alternatively, the records 200 and 220 may store different types of information about the respective first and second images. The records 200 and 220 are associated with feature vectors 210 and 230, respectively. The vectors 210 and 230 have a spatial interpretation in the feature space 260. When an image is used to search for any similar images stored in a database, a query vector 240 is a feature vector produced from the query image that is being used for the search. Finding images stored in the database that are similar to the query image is achieved by retrieving records within a predetermined radius of the query vector 240 derived from that query image. The predetermined radius is shown in FIG. 2 by a query radius 250, defining a circular query region 270 around the query point 240. Vectors located inside the query region 270, such as vector 210, are defined as matches for the query point 240, while vectors outside the query region, such as vector 230, are non-matches for the query point 240. The query radius 250 may be considered as a measure of the maximum allowed dis-similarity between a query vector and a feature vector. As vector 210 is within the query region 270, record 200 associated with vector 210 is returned in response to the query vector 240, whereas vector 230 is outside the query region, so record 220 is not returned.

Thus, the feature vector 210 is derived from a first image 100 and the feature vector 240 is derived from a query image (not shown). As feature vector 210 falls within the radius 250 of the query vector 240, that indicates a required level of similarity between the first image 100 and the query image. Assuming this is so, the record 200 is returned. The record 200 might store any type of information associated with the image 100. The record 200 might store any type of information associated with the image 100.

In one embodiment, a query image is associated with a single feature vector, where the feature vector indicates the distribution of colour and/or edges in the query image. In such an embodiment, a matching record is a record associated with an image of similar distribution of colour and/or edges. In another embodiment, a query image has many feature vectors, each feature vector being associated with information about the texture of a portion of the image. In this embodiment, there are many matches that can be combined to score the matching records (e.g., by voting), thus a high-scoring record is a record associated with an image that in parts looks the same as the query image.

If a non-matching record is returned, then it is called a false-positive error. If a matching record is not returned, then it is called a false-negative error. In many applications, there is an asymmetry between the impact of false-positive matches and false-negative matches. False-positive matches may be tolerable, assuming that the false positive rate is suitably low, as the false-positives can be eliminated by subsequent exhaustive checking of the candidates. The impact is high for a false negative match, because no subsequent processing can regain the loss.

Hash Table Updating

Figure 3:
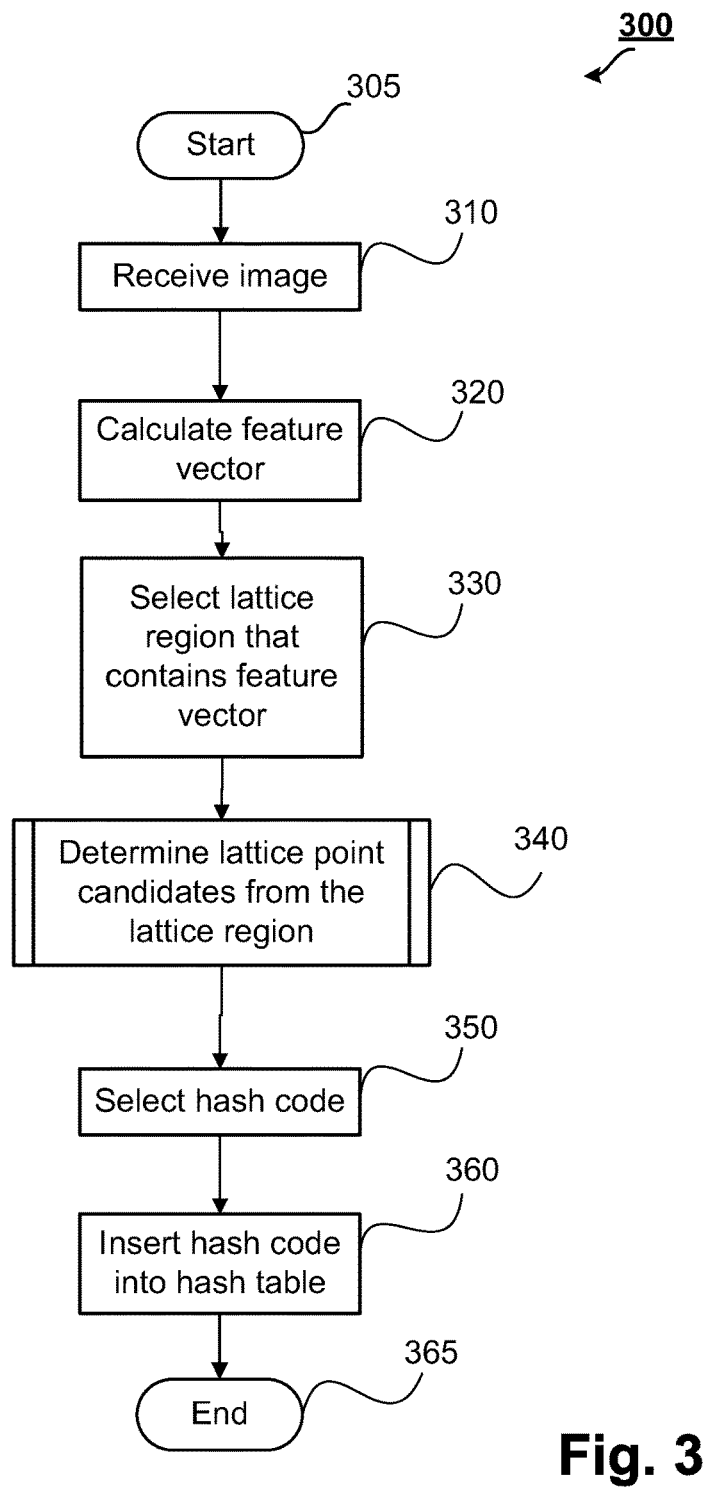
FIG. 3 is a flow diagram showing a hashing method according to an embodiment of the invention.

FIG. 3 is a flow diagram illustrating a hashing method 300 for determining a hash code for an input image according to an embodiment of the present disclosure. The hashing method 300 may be applied to a number of input images to form a hash table of images. Storing an image in the hash table allows the image to be retrieved when a query image is used to find similar images from the hash table, as will be described in more detail in relation to FIG. 9. The method 300 may be implemented as a computer program containing a plurality of instructions executing on the processor unit 1305.

The hashing method 300 starts at a START step 305 and proceeds to an image receiving step 310, which receives the input image. The image may have been captured using a camera 1327 or scanner 1326, or received and loaded by a user of the system, possibly via an input/output interface, or retrieved from a memory unit 1306 or storage device 1309. The image is then passed to a feature vector calculation step 320 to generate a feature vector that represents a portion of the image. In one embodiment, the feature vector calculation step 320 uses a SIFT algorithm to select a portion of the input image and to determine a feature vector. Alternatively, other feature vector calculation methods may be used to generate a feature vector, such as SURF (Speeded Up Robust Features), GIST (by Oliva and Torralba), Edge Histogram, or Colour Histogram features. To achieve high matching accuracy between two similar images, the similarity of two feature vectors, as calculated in step 320 for each image, should be high. Conversely for two dissimilar images, the similarity of two feature vectors should be low. For embodiments that use multiple features per image, this requirement may be relaxed, such that it is true on the balance of probabilities.

Control passes from step 320 to a lattice region selection step 330, which takes the calculated feature vector from step 320 as an input and determines an enclosing region of a multidimensional lattice that encloses the feature vector. In one embodiment, an A* lattice is applied to the feature space, where each point of the lattice provides a point to which a feature vector may be hashed. The hashing of feature vectors to one of the lattice points may be considered as a form of quantisation, as each feature vector is assigned to one of the lattice points. The simplest method of selecting the lattice point for hashing is to select the closest lattice point, however this will lead to unbalanced use of hash codes. The configuration of the lattice used in the feature space will be described below with reference to FIG. 11. For an n-dimensional feature space, the lattice region selection step 330 determines n+1 A* lattice points that define a Delaunay region as the enclosing region containing the feature vector. The Delaunay region is the smallest enclosing region around the feature vector formed by lattice points. The lattice region selection step 330 is determined by any of the known methods that determine the lattice points which are the corners of the A* Delaunay region that contains the feature vector. A* Delaunay regions are congruent and the coordinates of any Delaunay region that touches the origin can be obtained from a canonical Delaunay region by permutation of its coordinates. This can be exploited to efficiently determine the Delaunay region enclosing a point. For example: a first corner point is determined by rounding each coordinate of the feature vector to its nearest integer value, then adding or subtracting one from some coordinates so that the sum of coordinates is zero and the coordinates which are changed are those that result in the minimal difference between the first corner point and the input feature vector. Then, the remaining n corner points are each determined by adding a vector to the first corner point, where the coordinates of the added vector are either $i/(n+1)$ or $i/(n+1)-1$, such that the coordinates still all sum to zero. The choice of which coordinates of the added vector are $i/(n+1)$ and which coordinates are $i/(n+1)-1$ is determined by the sort order of the coordinates of the difference between the first corner point and the feature vector. The vector $v_k$ is defined to be the vector with the first $n+1-k$ coordinates equal to $k/(n+1)$, and the last k coordinates equal to $k/(n+1)-1$. The kth corner of the Delaunay region may be calculated as $c+\rho^{-1}(v_k)$, where c is the first corner, $\rho$ is the permutation that sorts the differences in increasing order and $\rho^{-1}(v_k)$ denotes the vector obtained by applying the inverse of $\rho$ to the order of the coordinates of $v_k$, for each value of k from 1 to n.

Figure 4A:
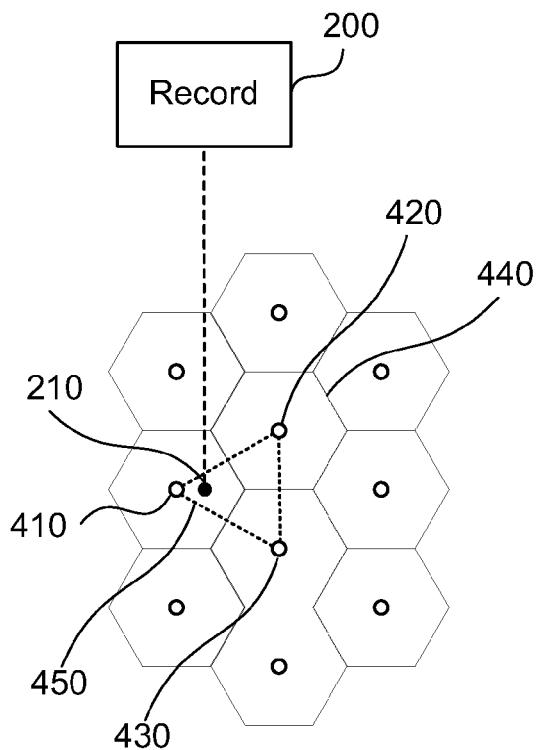
FIGS. 4A and 4B are diagrams showing an example spatial interpretation of the hash region for a given vector associated with a record.

An example of the lattice region selection step 330 will now be described with reference to FIG. 4A, which shows a feature vector 210 located in a 2-dimensional feature space. An A* lattice has been applied to the feature space to form a number of lattice points, such as points 410, 420, and 430. FIG. 4A also shows Voronoi regions around the lattice points, such as Voronoi region 440 which is located around the lattice point 420. A Voronoi region of a lattice point consists of all points which are closer to that lattice point than any other point in the lattice. Each Voronoi region is bounded by multiple flat surfaces, or hyper-surfaces for more than 3 dimensions, and each surface defines a boundary between two nearby lattice points. Determining a hash code of a feature vector is equivalent to determining in which Voronoi region the feature vector is located. Each corner of a Voronoi region is called a 'hole', which is where multiple Voronoi regions meet.

The feature vector 210, associated with the record 200 as described previously, is shown located within a triangular Delaunay region 450 formed by the three lattice points 410, 420, 430. A Delaunay region consists of all points that are no further from the hole than from any other hole. The vertices (i.e., corners) of a Delaunay region are the lattice points of the Voronoi regions that meet at the hole. No other lattice points are contained in the Delaunay region. A Delaunay region may thus be represented by the lattice points at its vertices.

When applied to the feature vector 210 shown in FIG. 4A, the lattice region selection step 330 returns the lattice points that form the Delaunay region 450, since the region 450 contains the feature vector 210. The Delaunay region 450 is the smallest region formed from the points of the lattice that encloses the feature vector 210.

Returning to FIG. 3, the lattice points determined in the lattice region selection step 330 are passed to a lattice candidate selection step 340. The purpose of the lattice candidate selection step 340 is to select lattice points from the enclosing region which are candidates for use as hash codes for the feature vector. A lattice point in the enclosing region is considered to be a valid candidate if, for any future query vector located within the query distance of the feature vector, a hash retrieval function will return an enclosing region that contains the hash value of the feature vector. For this reason, the process of adding a hash value to a hash table requires a matching hash retrieval process. A hash retrieval method will be described below with reference to FIG. 9. The output of the lattice candidate selection step 340 is a set of candidate lattice points to which the feature vector may be assigned, that is a set of candidate hash values. The operation of the lattice candidate selection step 340 will be described in more detail below in relation to FIG. 6 and FIG. 4B.

Figure 4B:
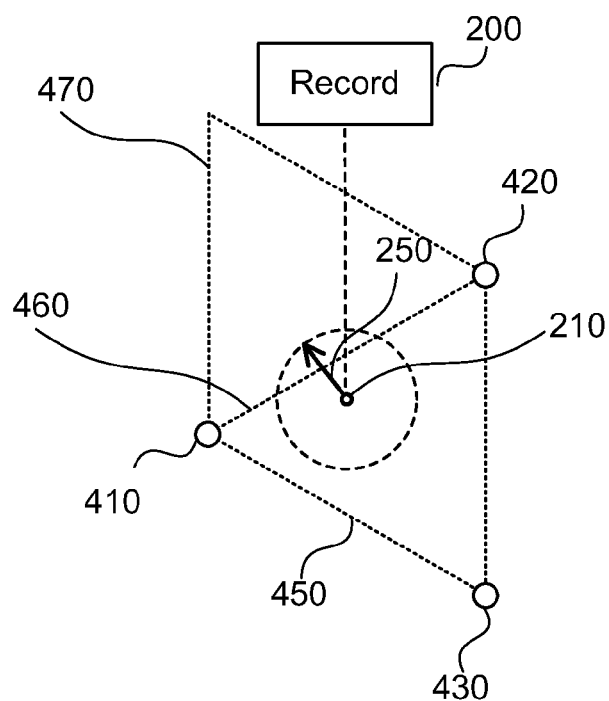

The operation of the lattice candidate selection step will now be described by way of example with reference to FIG. 4B. FIG. 4B shows the Delaunay region 450 of FIG. 4A in more detail. The feature vector 210 is shown located within the region 450 with a query radius 250 extending beyond a plane 460 defined by points 410 and 420. The query radius 250 defines an area where any future query point would expect to return the feature vector 250 as a feature vector of a similar image. The query radius is generally defined for querying a hash table, however the use of the query radius during construction of the hash table allows the hash table to be constructed taking into account the influence of the query radius. As the query radius 250 extends beyond the current Delaunay region 450 in to an adjacent Delaunay region 470 then the feature vector 210 should be hashed to a lattice point available to both of the current and adjacent Delaunay region. The lattice candidate selection step should exclude point 430 from the set of candidate lattice points as point 430 cannot be part of the adjacent Delaunay region 470 located on the other side of the plane 460, therefore the lattice point validator should exclude lattice point 430 from the set of candidate lattice points.

Figure 5A:
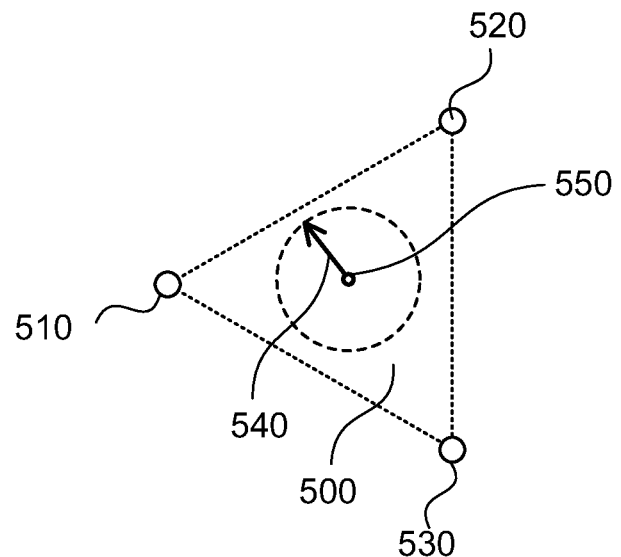
FIGS. 5A and 5B show arrangements of a feature vector located within an enclosing region in a two dimensional feature space.
Figure 5B:
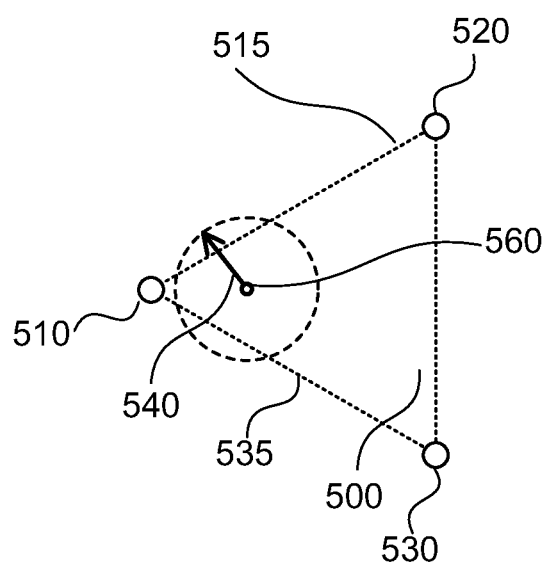

FIGS. 5A and 5B show more possible arrangements of a feature vector located within a Delaunay region 500 in a 2-dimensional feature space. FIG. 5A shows the situation where a feature vector 550 is at the centre of the Delaunay region 500. A query radius 540 associated with the feature vector 550 does not extend past any side of the region 500. In this situation, all query points located within the region 500 should return the feature vector 550, so the lattice points 510, 520, and 530 may be considered by the lattice candidate selection step as possible lattice points for use in generating a hash code for the feature vector 550.

FIG. 5B shows a situation where a feature vector 560 is located close to lattice point 510 of the Delaunay region 500, so that the query radius 540 associated with the feature vector 560 now crosses over both planes 535 and 515. The result is that feature vector 560 may be considered a similar feature vector to query vectors located in the region 500 or adjacent regions, not shown, located on the other side of planes 535 and 515. Any query vector located in one of these three regions should return the hash of the feature vector 560. The only lattice point that is common to region 500 and the adjacent regions is the lattice point 510.

Returning to FIG. 3, the hashing method 300 continues at a hash code selection step 350, which receives the candidate lattice points from the lattice candidate selection step 340. The purpose of the hash code selection step 350 is to select a single lattice code from the candidate lattice points as the hash code for the feature vector. In the preferred embodiment, the hash code selection step 350 examines each lattice point of the lattice candidate points to determine a count of how many records have previously been associated with each lattice point. The hash code selection step 350 can then quantise the feature vector to the lattice point with a minimum count of associated feature vectors and use the hash value associated with the lattice point. Alternatively, the feature vector may be assigned randomly to one of the candidate lattice points which will remove the requirement to determine the count of how many feature vectors have previously been associated with each lattice point. Yet another method for selecting a hash code is to choose a lattice point from the candidate lattice points such that the chosen lattice point is the furthest away from the centre of mass of records—thus tending to spread the distribution of associated records across the lattice.

The hashing method 300 passes from step 350 to a hash insertion step 360, where the selected hash code is linked to the image record. This stores a link between the selected hash code associated with the determined lattice point and the portion of the image, represented by the feature vector. This information is then recorded in the hash table for use in the hash retrieval stage. Control passes from step 360 to an END step 365 and the hashing method 300 terminates.

Lattice Candidate Selection

The lattice candidate selection step 340 of FIG. 3 will now be explained with reference to FIG. 6, which shows a lattice candidate selection method 600 as may be used in the lattice candidate selection step 340 of FIG. 3. The purpose of the lattice candidate selection method 600 is to determine which lattice points of the enclosing region, containing the feature vector, are suitable as hash codes for the feature vector. The method starts at a START step 605 and proceeds to an initialisation step 610, which initialises a set of candidate lattice points to be empty. The remaining steps of the method 600 will loop over each lattice point of the enclosing region until all of the lattice points have been processed. Loop control step 620 tests if all the lattice points have been processed. If all the lattice points have been processed, 'yes', then control passes to termination step END 630, where the candidate selection method stops and the set of candidate lattice points is returned. If at step 620 not all of the lattice points have been processed, 'no', then control passes to selection step 640, which selects an unprocessed lattice point from the enclosing region.

Plane determination step 650 determines a hyper-plane from the enclosing region. The hyper-plane is a plane passing through all the lattice points of the enclosing region excluding the selected, unprocessed point. In the example of FIG. 4B, the hyper-plane is plane 460 when the selected point is lattice point 430.

Returning to FIG. 6, control passes from plane determination step 650 to a distance calculation step 660, which computes a perpendicular distance from the feature vector to the hyper-plane. The perpendicular distance may be calculated by determining a unit normal to the hyper-plane passing through the lattice points in the hyper-plane, and calculating the dot product of the normal with the difference of the feature vector and any point in the hyper-plane. The normal may be calculated using methods such as Singular Value Decomposition. Computing this distance may be slow, but the time only affects the time to update the hash table and does not affect the time to query the hash table which determines recall speed of the system. Once the perpendicular distance is determined, control passes to distance test step 670, which compares the perpendicular distance to the query radius. The distance test step 670 determines if the query radius extends from the feature vector and passes through the hyper-plane and into an adjacent region. If the query radius does extend through the hyper-plane, to an adjacent region, then the selected point is not suitable as a hash code for the feature vector as the point is not common to the adjacent region. If the query radius does not extend in to an adjacent region through the hyper-plane, then any adjacent region the query radius does extend to will have the selected point in common point. If step 670 determines that the perpendicular distance is not greater than the query distance, No, then control passes back to loop control step 620 to determine whether there are any more lattice points remaining to be processed. However, if at step 670 the perpendicular distance is greater than the query distance, Yes, control passes to a hash code addition step 680.

The hash code addition step 680 determines a hash code for the selected point and adds the hash code to the set of candidate lattice points. As discussed above, the hash code and the lattice point are linked so that having a hash code allows the lattice point to be determined It is also possible that the hash code uses information from the lattice point so that the hash code and lattice point are effectively the same. The hash code addition step 680 may use known methods for determining the hash code of a point. Most standard software libraries provide a suitable function, such as the Arrays.hashCode method in Java. Alternatively, any of the known methods for labelling lattice points with integers may be used as the point to which the feature vector is quantised as a lattice point. It is also possible to use an array of numbers as a hash code for the lattice point, for example by representing a lattice point by a lattice coordinate vector. A lattice coordinate vector is constructed for a lattice point using the coordinates of the lattice point with respect to a basis consisting of generators for the lattice. In this case, it is possible to represent the hash table as a tree structure, or other structure known in the art, for associating lattice coordinate vectors with records.

First Alternative Lattice Candidate Selection

Figure 7:
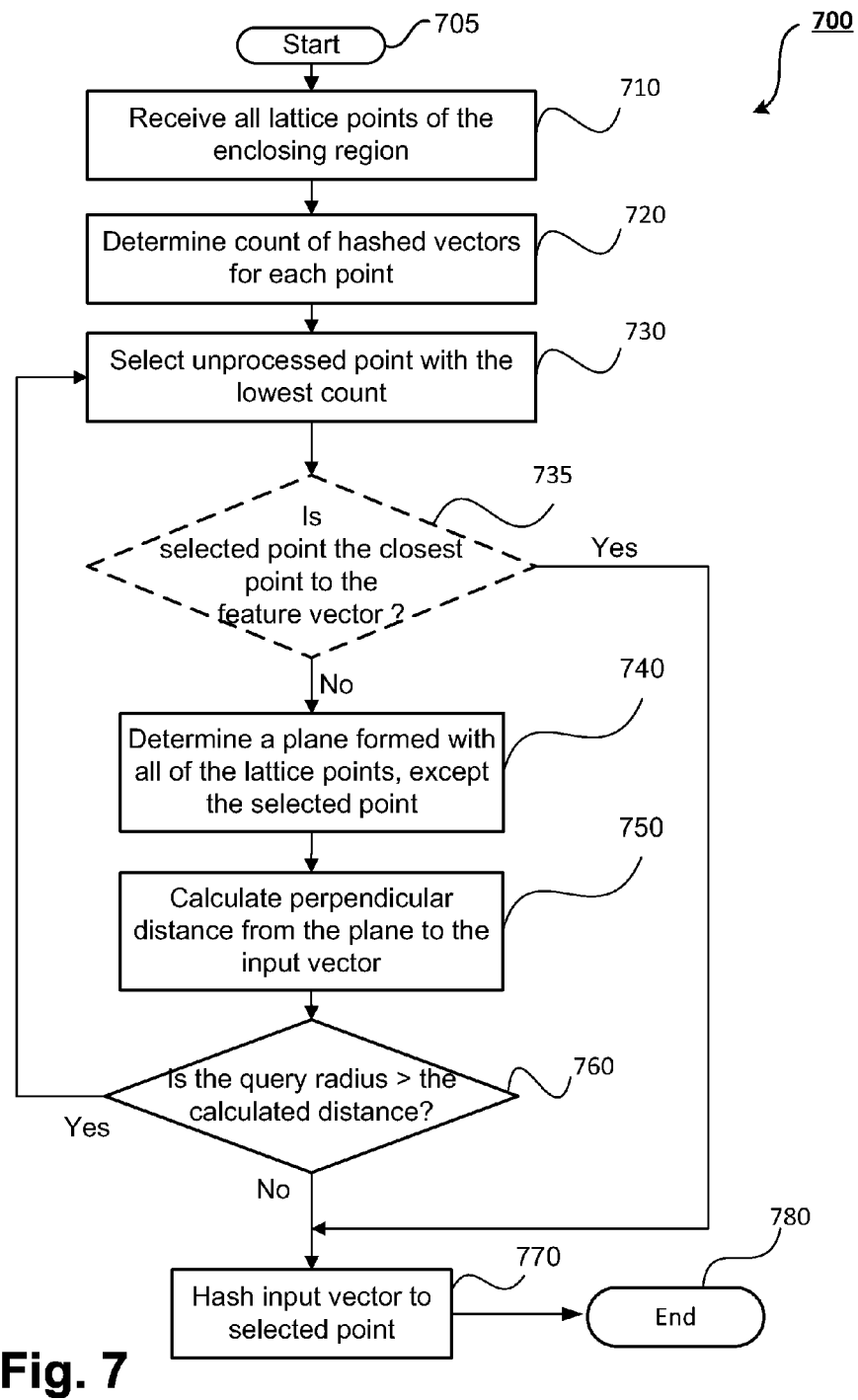
FIG. 7 is a flow diagram showing a hash determination method that may be used in one or more steps of the hashing method of FIG. 3.

An alternative lattice candidate selection method will now be explained with reference to a hash determination method 700 of FIG. 7. The hash determination method 700 replaces both the lattice candidate selection step 340 and the hash code selection step 350 of FIG. 3 with the advantage that it is possible to select a hash value without processing all lattice points that form the enclosing region. The method works by processing all the hash codes of the enclosing region in order based on a count of the number of records already associated with the lattice point. The first suitable point is then used as the hash code of the feature point and results in the feature point being assigned to a suitable lattice point with the lowest count of assigned feature vectors.

The hash determination method 700 starts at a START step 705 and proceeds to a lattice points reception step 710, which receives all the points that define the enclosing region around the query vector. Next, a count determination step 720 processes each of the lattice points that form part of the enclosing region to determine how many records have already been associated with each point. This is the same process that was described previously in the hash code selection step 350 of FIG. 3, however the count determination step of 720 determines the count for all lattice points of the enclosing region. The lattice counts are then used in a point selection step 730, which selects the unprocessed lattice point with the lowest count. Once the lattice point has been selected, then the point is checked to see if it is permissible to hash the feature vector to the lattice point. The point selection step 730 is the start of a loop that continues until a suitable lattice point is found.

An optional closest point test 735, shown in a dotted outline, may be executed next to determine if the selected lattice point is the closest lattice point to the feature vector. If the selected point is the closest, Yes, then the hash determination method 700 jumps to a hashing step 770 which will be described below, otherwise processing continues. In another embodiment of the present disclosure, the closest lattice point to the feature vector is determined by calculating the distance from the query point to each point in the enclosing region (as determined in step 330) of FIG. 3). If the optional closest point test 735 is not included or if the selected point in step 735 is not the closest lattice point to the feature vector, No, then the hash determination method 700 continues with two steps that are the same as the plane determination step 650 and the distance calculation step 660 of FIG. 6. First, a plane determination step 740 forms a plane based on all the lattice points of the enclosing region excluding the selected lattice point. Next, a distance calculation step 750 calculates a perpendicular distance from the plane to the input feature vector. Control then passes to a distance step 760, which compares the calculated distance to the query radius. If the query radius is greater than the calculated distance from the feature vector to the plane, Yes, then the selected point is not suitable for hashing the feature vector. In this case, the hash determination method 700 loops back to the point selection step 730 where an unprocessed point will be selected. If the query radius is less than or equal to the calculated distance, No, then the query radius does not extend beyond the plane and the selected point is suitable for hashing the feature vector. This situation should occur for at least one lattice point of any enclosing region when parameters of the lattice have been selected correctly. More information on selecting correct parameters for the lattice will be discussed below. In this case, control passes from step 760 to step 770.

The hash determination method 700 passes to a hashing step 770 which may be performed in a similar manner to the hash code selection step 350. The hashing step 770 takes the selected lattice point as input and produces a hash value for the input feature vector as the output. Control passes from step 770 to an END step 780 and the method 700 terminates.

Second Alternative Lattice Candidate Selection

Figure 6:
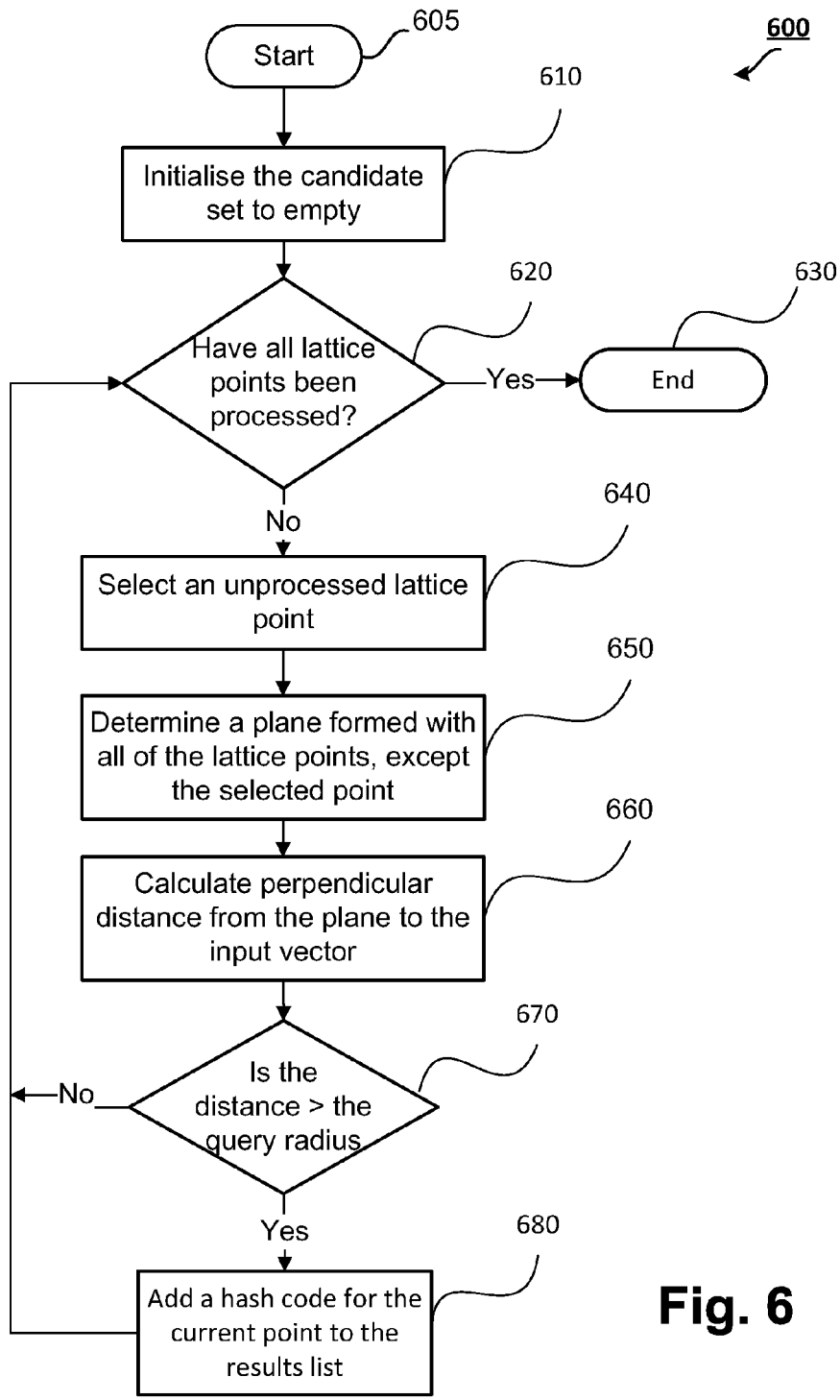
FIG. 6 is a flow diagram showing a method for selecting candidate lattice point as used in the hashing method of FIG. 3.
Figure 8:
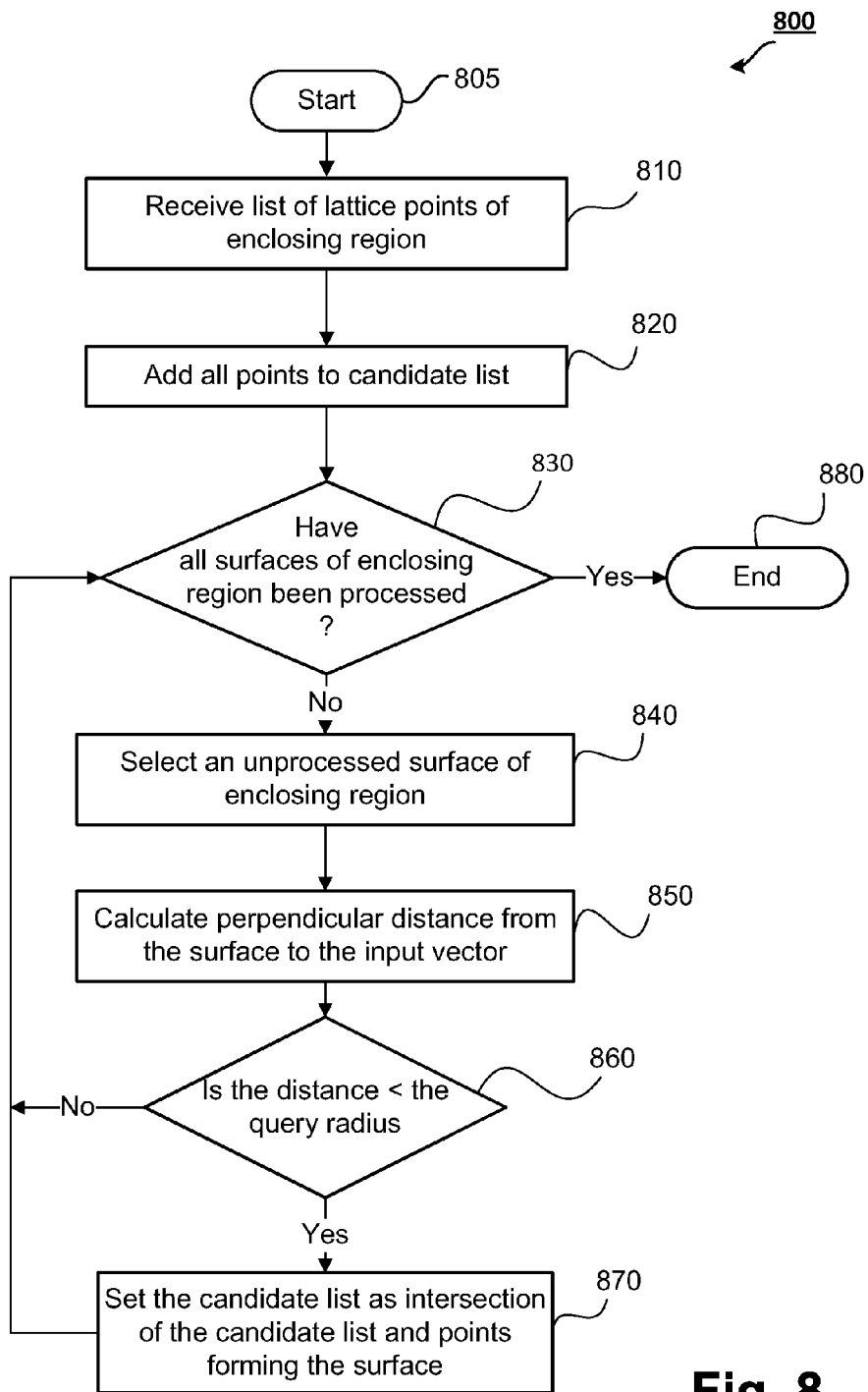
FIG. 8 is flow diagram showing an alternative lattice candidate point selection method that may be used in the hashing method of FIG. 3.

The lattice candidate selection method 600 of FIG. 6 may alternatively be implemented as selection method 800 of FIG. 8. The selection method 800 has the same input and outputs as the lattice candidate selection method 600 and starts at a Start step 805 and proceeds to a lattice candidate receiving step 810, which receives all the lattice points that define the smallest enclosing region. All of the lattice points are then used to populate a lattice point candidate list at a list forming step 820. The candidate list may be stored in memory 1306 or a storage device 1039 of the computer 1300.

The selection method 800 then starts a looping stage where every surface of the enclosing region is tested. The looping stage starts at a surface processing test 830, which determines if all the surfaces of the enclosing regions have been processed. If all the surfaces have been processed, Yes, then the selection method 800 moves to termination step 880 and the selection method 800 terminates. However, if at step 830 all the surfaces have not been processed, No, then the method proceeds to a surface selection step 840, which selects one of the unprocessed surfaces. A distance calculation step 850 then calculates a perpendicular distance from the selected surface to the feature vector. This is the same process used for the distance calculation step 660 of FIG. 6. The calculated distance is then compared to the query radius in a distance test 860. If the distance is not less than the query radius, No, then the selection method 800 loops back to the surface processing step 830 to see if there are any more surfaces of the enclosing region to process. If at step 860 the distance is less than the query radius, Yes, control passes to a refine list step 870 to refine the lattice point candidate list. The candidate list is refined by determining an intersection between the existing candidate list and any lattice points that are part of the enclosing region that defines the plane. When the candidate list is all lattice points of the enclosing region, then the intersection with the lattice points forming the surface will be all the lattice points of the surface. Only the points that are common to both the surface and the candidate list will be returned by the intersection. The operation of the intersection function will reduce the number of points on the candidate list. Upon completion of the selection method 800, the candidate list is used in the hashing method 300 for further processing, as described above. The candidate list will contain at least one lattice point, and at most the lattice points that define the smallest enclosing region.

Hash Table Query

Figure 9:
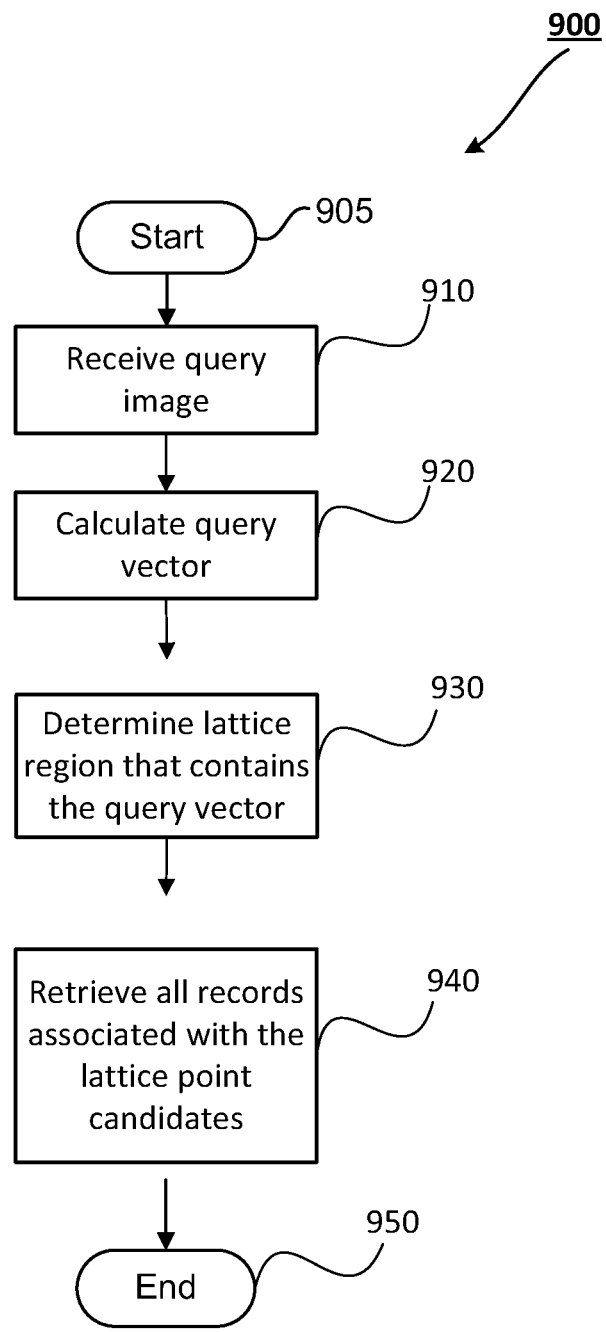
FIG. 9 is a flow diagram showing a hash table query method.

A hash table query method 900 will now be described with reference to FIG. 9. The hash table query method 900 receives a query image and searches for any similar images by searching records stored in the hash table. The similarity of the images is determined by the size of the query radius, where a number of images considered to be similar will increase as the query radius increases. The hash table query method 900 uses the same feature space and lattice that was used for the hashing method 300. In a preferred embodiment, the lattice used is an A* lattice.

The hash table query method 900 starts at a START step 905 and proceeds to an image receiving step 910, which receives a query image. Control passes to a query vector calculation step 920, which calculates a query vector from the query image. In one implementation, the query vector calculation step 920 uses the same process used in the feature vector calculation step 320 to provide consistent results between the hashing method 300 and the hash table query method 900. In some applications, the query vector calculation process used in step 920 may be different from the process used in the feature vector calculation step 320. For example, if there is some known bias or regularity in the set of possible query images, then the query vector calculation step may be modified to take advantage of the known bias or regularity. As an example, if it is known that all query images will come from a low quality web camera, whereas the database images are high-quality digital photos, then the vector calculation steps may be different. The query vector is then passed on to a lattice region selection step 930, which determines a region enclosing the query vector. In one implementation, the lattice region selection step 930 uses the same process as described above in relation to the lattice region selection step 330 of hashing method 300.

Figure 10:
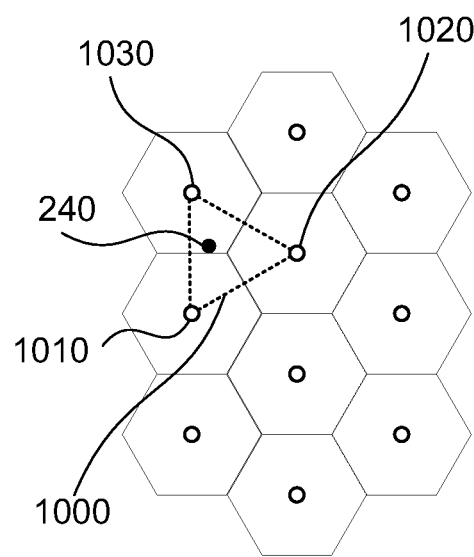
FIG. 10 is a diagram showing the spatial interpretation of the hash region for a given query vector.
Figure 11:
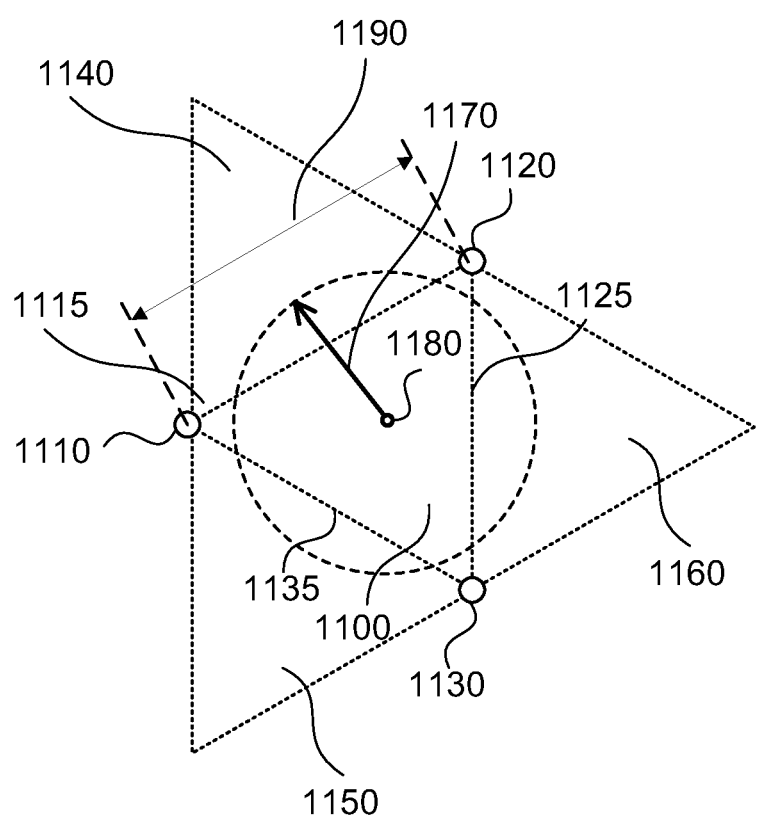
FIG. 11 shows a feature vector in an enclosing region in a two dimensional feature space.

The operation of the lattice region selection step 930 will now be explained with reference to FIG. 10, which shows a query vector 240 located within an enclosing region 1000. The enclosing region 1000 is a Delaunay region defined by three lattice points 1010, 1020, and 1030. The diagram in FIG. 10 is illustrative only and shows a 2-dimensional example. In general, embodiments of the present disclosure are applicable to n-dimensional vectors, in which case, the lattice selection step 730 provides n+1 A* lattice points that define a Delaunay region containing the query vector.

Returning to FIG. 9, the selected lattice points that define the enclosing regions are passed from step 930 to a record retrieval step 940, which processes each of the lattice points to produce a list of query hash codes, wherein there is a query hash code for each of the lattice points of the enclosing region. The query hash codes are produced using the same method applied to produce hash codes in the hash code addition step 680 of the candidate selection method 600. The query hash codes are then used to retrieve the image records associated with hash codes from the hash table. The result is that the lattice points of the enclosing region are used to retrieve image records that have been associated with the lattice points in the hashing method 300. The set of retrieved image records may be larger than just those associated with features located within the query radius around the query vector. This is because there may exist some records associated with feature vectors that became associated with included lattice points, even though the feature vectors were further than the query radius from the query vector. However, the set of retrieved images includes all of the images located within the query radius and additional images. The additional images may be filtered out using a subsequent processing stage, or the set of retrieved images may be small enough for suitable use as a set of similar images. These similar images may then be presented to a user for validation of the similarity. The user may then review each of the retrieved images and accept or reject the image as a similar image.

Lattice Sizing

As mentioned above, one embodiment of the present disclosure uses points of an A* lattice to provide hash codes for feature vectors. How the A* lattice is configured is important for correct operation of the image retrieval system. Consider the 2-dimensional feature space of FIG. 11, which shows a situation similar to FIG. 5A with a feature vector 1180 located at the centre of a Delaunay region 1100. A query radius 1170 has been used, extending from the feature vector 1180. Due to the size of the query radius 1170 relative to the lattice point spacing, the query radius 1170 extends past all three planes 1115, 1125, and 1135 of the enclosing region 1100 and in to adjacent Delaunay regions 1140, 1150, and 1160. In this situation, a query vector located in any of the adjacent regions 1140, 1150, and 1160 should return the image associated with the feature vector 1180 as a similar image. However, it is not possible to find a lattice point that is common to all four regions 1100, 1140, 1150, and 1160. As a result, the retrieval system will fail to operate correctly. From this, it is clear that there is a relationship between sizing of the lattice and the query radius. In one embodiment, the lattice is as dense as possible, provided that a ball with a radius equal to the query radius fits inside the Delaunay cell. This is equivalent to sizing the lattice such that the in-radius of the Delaunay cells is equal to the query radius, r. Half of the minimum distance between lattice points is known as the packing radius, 1190. It corresponds to the maximum radius of non-overlapping spheres, centred at lattice points. The scale of a lattice can be defined in terms of its packing radius. For an A* lattice with packing radius rho and dimensionality n, the lattice can be sized using multiplication by $r*sqrt((n+1)*(n/2))/rho$. Equivalently, to make the in-radius equal to r, the packing radius should be set to $r*sqrt((n+1)*(n/2))$.

While one embodiment of the present disclosure uses an A* lattice, other lattice types may equally be used. However, for other lattice families such as Z, A, D, and D*, it may be that to ensure high accuracy the Delaunay cells are large, thus causing many false positive matches to be returned and leading to slow query times. For some lattice families, such as the Z lattice, the Delaunay cells consist of a large number of lattice points, thus creating a large number of query hash codes, and leading to slow query times. Some lattices, such as the Leech Lattice, may avoid this problem, but require time consuming methods for determining the enclosing Delaunay region to a given feature vector, also leading to slow query times.

Advantage

Figure 12A:
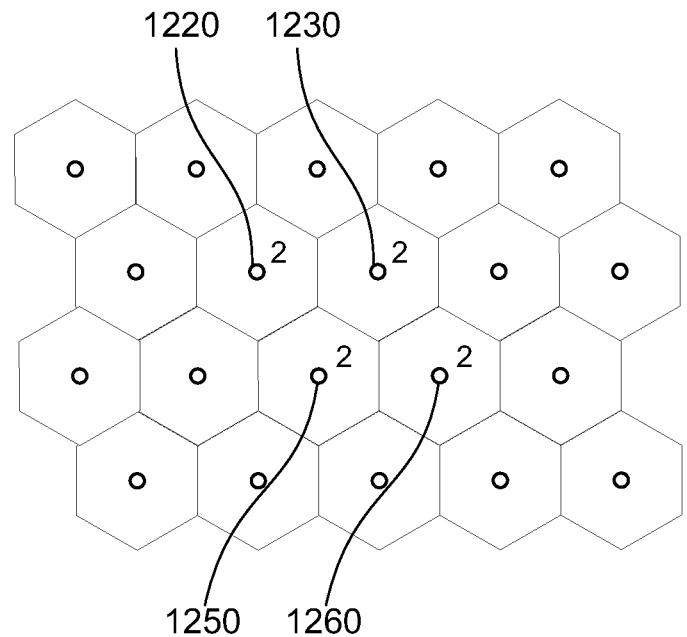
FIGS. 12A and 12B show feature vector assignment to lattice points in a two dimension feature space.
Figure 12B:
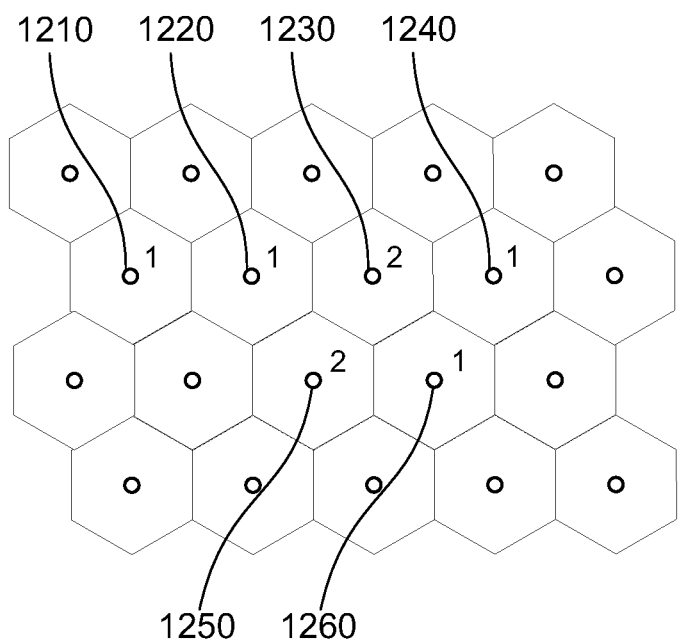

An advantage of the retrieval system is illustrated in FIGS. 12A and 12B, which show a 2-dimensional feature space with an A* lattice. In FIG. 12A, eight records have been associated with the lattice points, with two records being associated with each of lattice points 1220, 1230, 1250, and 1260. FIG. 12B shows an alternative hashing result that may occur using the hashing method 300, depending on the feature points under consideration. In this situation, some of the records have been associated with lattice points that were unused in FIG. 12A. For example, lattice point 1220 has two records in FIG. 12A, but only one record in FIG. 12B. The second record that was associated with lattice point 1220 is instead associated with point 1210. This would occur if a distance from a plane formed between the two lattice points 1210 and 1220 to the feature vector was less than the query radius. Each used lattice point in FIG. 12B averages 1.3 records compared to the average of 2 records in FIG. 12A. The advantage of the retrieval system arises as fewer image records may be returned for a given query vector while ensuring that all relevant image records are located. The use of lattices is more memory efficient than multiple registration strategies such as LSH, because only one association is stored between records and hash codes.

Alternative Embodiments

While the retrieval system has been described above for use with images, it is also possible that the system may be used to retrieve other data types. For example, a feature vector can be generated for text or a portion of text. One method of generating a feature vector for text is to use the so-called Bag-Of-Words representation of the text. A feature vector can be generated from a Bag-Of-Words by treating each word or sequence of words as a dimension with its coordinate value set to the frequency of the word or sequence or words. This may then be subject to dimensional reduction, such as Principle Component Analysis (PCA), to generate a feature vector for the text. The retrieval system can then be used to quickly access records associated with text, by using a query containing sample text. In another application, a feature vector may be a paper-fingerprint. A paper-fingerprint is an array of numbers that can be used to identify paper from its fibre structure. The retrieval system can then be used to quickly access records associated with an individual piece of paper, by using a query containing a paper-fingerprint.

An alternative embodiment of the hashing method may use alternative enclosing regions. One alternative uses the Voronoi cell to define an enclosing region where the vertices are holes instead of lattice points. In the alternative embodiment, the lattice region selection method 330 determines the 'holes' that define the Voronoi region around the feature vector. These holes are used instead of lattice points and the candidate selection method shown in FIG. 8 is then applied to select candidate holes according to distance of the feature vector from the surfaces of the Voronoi cell. Step 350 selects a hash code corresponding to a hole chosen by the candidate selection step. The query process in FIG. 9 remains unchanged: the region that contains the query vector is determined using the same method, and the records associated with the hash code for each point of the enclosing region are retrieved. Examining the lattice of FIG. 4A shows that the Voronoi cell in 2-dimensions will be formed from six lattice points, not shown, compared to the three points for the Delaunay cell. It should be noted that this alternative embodiment is functionally equivalent to the main embodiment. However, the properties of the enclosing region, will be different in each formulation.

An alternative embodiment of the retrieval system uses a re-hashing technique during the hash code selection step 350 and hash insertion step 360. In this alternative embodiment, a hash code is selected for the feature vector while a list of alternative hash codes is maintained. When a record is inserted into the hash table, then the alternative hash codes are also linked to the record. The inclusion of alternative hash codes in the hash table allows for a redistribution of records. If one hash code is found to have a large number of records associated with the code, then some of the records associated with the hash code may be redistributed to alternative hash codes. The re-hashing technique then allows for hash codes with a large number of associated records to be altered during later processing of the hash table. A further alternative omits storing the alternative hash codes, and instead a redistribution process reapplies the hashing method 300 to determine alternative hash codes for the record.

INDUSTRIAL APPLICABILITY

The arrangements described are applicable to the computer and data processing industries and particularly for the image processing industry.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of searching for similar images in a database of images, the method comprising:
   performing, by a processor, an image registration to store a plurality of records each being corresponding to a feature vector of an image, wherein said image registration for each of said records comprises:

selecting from a multidimensional lattice a lattice region containing said feature vector of said image;
identifying candidate lattice points from said lattice region based on a query radius;
selecting one of said identified candidate lattice points as a hash code;
associating the record corresponding to said feature vector of said image with the selected hash code in a hash table in the database of images; and
performing an image query, by the processor, to retrieve, based on a query vector of a query image, at least one of said stored records from said hash table in the database of images, said image query comprising:
identifying, based on said query vector and said query radius, hash codes in said hash table, wherein images associated with the identified hash codes are images that are similar to the query image; and
retrieving at least one of said stored records associated with at least one of said identified hash codes from the database of images.

2. The method according to claim 1, wherein said lattice region is a Delaunay region, being the smallest enclosing region around the feature vector formed by lattice points of the multidimensional lattice.

3. The method according to claim 2, wherein said lattice region includes n+1 lattice points for an n-dimensional feature space.

4. The method according to claim 1, wherein said multidimensional lattice is selected from the group of lattices consisting of: A lattice, D lattice, A* lattice, D* lattice, Z lattice, and Leech lattice.

5. The method according to claim 1, wherein said feature vector is derived from a portion of an image, text, or paper-fingerprint.

6. The method according to claim 1,
wherein said query vector and said query radius define a query region, and
further wherein said identified hash codes are located within said query region.

7. The method according to claim 6, wherein said query vector is derived from a query image.

8. The method according to claim 1, wherein said identifying of candidate lattice points from said lattice region is based on a comparison between said query radius and a perpendicular distance from the feature vector to a nearest boundary of a Voronoi cell associated with each lattice point bounding said selected lattice region.

9. The method according to claim 1, wherein said selecting of said one of said identified candidate lattice points as said hash code is based on a distribution criteria for said multidimensional lattice.

10. The method according to claim 9, wherein said distribution criteria is based on any one of a) a present state of the multidimensional lattice, b) a distance of said identified candidate lattice points from a center of mass of the record, and c) random distribution of the feature vector to one of said identified candidate lattice points.

11. The method according to claim 10, wherein said present state of said multidimensional lattice is based on a number of feature vectors assigned to each of said identified candidate lattice points.

12. The method according to claim 1, wherein the query radius is a measure of maximum allowed dis-similarity between the query vector of the query image and the feature vectors of the image in the stored records.

13. A system of searching for similar images in a database of images, the system comprising:
a storage device for storing a computer program; and
a processor for executing the program, said program comprising code for performing the method steps of:
performing an image registration to store a plurality of records each being corresponding to a feature vector of an image, wherein said image registration for each of said records comprises:
selecting, from a multidimensional lattice, a lattice region that contains said feature vector of said image;
identifying candidate lattice points from said lattice region based on a query radius;
selecting one of said identified candidate lattice points as a hash code; and
associating the record corresponding to said feature vector of said image with the selected hash code in a hash table in the database of images; and
performing an image query to retrieve based on a query vector of a query image, at least one of said stored records from said hash table in the database of images, said image query comprising:
identifying, based on said query vector and said query radius, hash codes in said hash table, wherein images associated with the identified hash codes are images similar to the query image; and
retrieving at least one of said stored records associated with at least one of said identified hash codes from the database of images.

14. A non-transitory computer readable storage medium having recorded thereon a computer program for directing a processor to execute a method of searching for similar images in a database of images, said computer program comprising code for performing the steps of:
performing, by a processor, an image registration to store a plurality of records each being corresponding to a feature vector of an image, wherein said image registration for each of said records comprises:
selecting from a multidimensional lattices a lattice region that contains said feature vector of said image;
identifying candidate lattice points from said lattice region based on a query radius;
selecting one of said identified candidate lattice points as a hash code; and
associating the record corresponding to said feature vector of said image with the selected hash code in a hash table in the database of images; and
performing an image query, by the processor, to retrieve, based on a query vector of a query image, at least one of said stored records from said hash table in the database of images, said image query comprising:
identifying, based on said query vector and said query radius, hash codes in said hash table, wherein images associated with the identified hash codes are images that are similar to the query image; and
retrieving at least one of said stored records associated with at least one of said identified hash codes from the database of images.

* * * * *